US012639030B2

(12) United States Patent
Xu et al.

(10) Patent No.: US 12,639,030 B2
(45) Date of Patent: May 26, 2026

(54) DATA STREAM TRANSMISSION METHOD, DEVICE, COMMUNICATION APPARATUS, AND STORAGE MEDIUM

(71) Applicant: HUAWEI TECHNOLOGIES CO., LTD., Shenzhen (CN)

(72) Inventors: Qiang Xu, Toronto (CA); Wenhao Wu, Shenzhen (CN); Xuan Zhou, Shenzhen (CN); Chenhe Li, Shenzhen (CN); Jun Li, Toronto (CA); Yanshan He, Shenzhen (CN); Yibin Zhai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 18/568,838

(22) PCT Filed: Jun. 9, 2022

(86) PCT No.: PCT/CN2022/097899
§ 371 (c)(1),
(2) Date: Dec. 10, 2023

(87) PCT Pub. No.: WO2022/258016
PCT Pub. Date: Dec. 15, 2022

(65) Prior Publication Data
US 2024/0272864 A1     Aug. 15, 2024

(30) Foreign Application Priority Data
Jun. 10, 2021    (CN) .......................... 202110658070.6

(51) Int. Cl.
*H04R 1/10* (2026.01)
*G06F 3/16* (2006.01)
(Continued)

(52) U.S. Cl.
CPC ............... *G06F 3/162* (2013.01); *H04R 3/00* (2013.01); *H04R 2420/07* (2013.01)

(58) Field of Classification Search
CPC ........ G06F 3/162; H04R 3/00; H04R 2420/07
(Continued)

(56) References Cited

U.S. PATENT DOCUMENTS

| | | | |
|---|---|---|---|
| 8,949,744 B2 | 2/2015 | Peissig et al. | |
| 9,351,090 B2 | 5/2016 | Tachibana et al. | |
| 2017/0048613 A1* | 2/2017 | Smus .................. | H04L 65/1069 |

FOREIGN PATENT DOCUMENTS

| | | |
|---|---|---|
| CN | 104331156 A | 2/2015 |
| CN | 107211225 A | 9/2017 |

(Continued)

*Primary Examiner* — Ammar T Hamid

(57) ABSTRACT

A data stream transmission method includes: sending a first target signal; obtaining a first moment, where the first moment is obtained based on a time point at which a first receiving device on a second device receives the first target signal; obtaining a second moment, where the second moment is obtained based on a time point at which a second receiving device on the second device receives the first target signal, where the first receiving device and the second receiving device are located at different positions of the second device, and the second device is a head-mounted device; and when determining, based on the first moment and the second moment, that a data transmission condition is met, transmitting a target data stream to the second device.

19 Claims, 13 Drawing Sheets

User device 20

First target signal

First target signal 101 102
Head mounted device 10

User device 20

User device 20

(51) Int. Cl.
     *H04R 3/00*          (2006.01)
     *G10K 11/16*       (2006.01)

(58) Field of Classification Search
     USPC .................................................. 381/74, 71, 6
     See application file for complete search history.

(56)                References Cited

FOREIGN PATENT DOCUMENTS

| | | | |
|---|---|---|---|
| CN | 107683602 | A | 2/2018 |
| CN | 108810742 | A | 11/2018 |
| CN | 109379653 | A | 2/2019 |
| CN | 106415721 | B | 8/2019 |
| WO | 2014035118 | A1 | 3/2014 |

\* cited by examiner

1

DATA STREAM TRANSMISSION METHOD, DEVICE, COMMUNICATION APPARATUS, AND STORAGE MEDIUM

CROSS-REFERENCE TO RELATED APPLICATIONS

This application is a National Stage of International Application No. PCT/CN2022/097899, filed on Jun. 9, 2022, which claims priority to Chinese Patent Application No. 202110658070.6, filed on Jun. 10, 2021, both of which are hereby incorporated by reference in their entireties.

TECHNICAL FIELD

The present invention relates to the field of communication technologies, and in particular, to a data stream transmission method, a device, a communication apparatus, and a storage medium.

BACKGROUND

With development of wireless communication technologies and increase in a quantity of electronic devices, there are increasing scenarios in which a head-mounted device needs to transmit data with a plurality of user devices. Consequently, a user needs to frequently connect the head-mounted device to the plurality of user devices. For example, a headset is currently connected to a mobile phone of the user; and when the user wants to watch a movie on a tablet computer, the user needs to connect the headset to the tablet computer. Currently, connections between the head-mounted device and the user devices are mainly switched in the following two manners:

Manner 1:

With the help of a graphical user interface (Graphical User Interface, GUI) on the user device, the GUI interface includes a device list, and the device list presents all head-mounted devices that have been paired with the user device. The user finds the headset from the device list, and manually taps the headset to perform connection, so that the mobile phone transmits data to the headset. However, as a quantity of devices in the device list increases, costs of recognizing the devices gradually increase, and an incorrect device may be selected. As a result, precision of data transmission between the user device and the head-mounted device is low.

Manner 2:

The connection to be established with a user device is automatically established. For example, if a playing event is detected on a device (the device has established a connection to the headset), the headset automatically establishes the connection to the tablet computer, and the tablet computer transmits data to the headset. However, whether the data transmitted to the headset is a result desired by the user is not considered. As a result, precision of data transmission between the user device and the head-mounted device is low.

The connection between the head-mounted device and the user device is prone to incorrect data transmission. Consequently, precision of data transmission between the user device and the head-mounted device is low, and user experience is poor.

SUMMARY

This application provides a data stream transmission method, a device, a communication apparatus, and a storage medium, so that a user device transmits a data stream to a head-mounted device only when a data transmission condition is met, thereby improving precision of data stream transmission between the head-mounted device and the user device and user experience.

According to a first aspect, an embodiment of this application provides a data stream transmission method, applied to a first device. The method includes:

sending a first target signal; obtaining a first moment, where the first moment is obtained based on a time point at which a first receiving device on a second device receives the first target signal; obtaining a second moment, where the second moment is obtained based on a time point at which a second receiving device on the second device receives the first target signal, where the first receiving device and the second receiving device are located at different positions of the second device, and the second device is a head-mounted device; and when determining, based on the first moment and the second moment, that a data transmission condition is met, transmitting a target data stream to the second device.

In this implementation of this application, the first device may be any user device that has a capability of playing, receiving, and sending audio and video data and a capability of performing a voice or video call, and the second device is a head-mounted device that has a capability of receiving and playing a data stream, for example, receiving and playing audio data. When the first device needs to transmit data to the second device, the first device does not directly transmit the data to the second device. Instead, the first device transmits the target data stream to the second device only when determining, based on the first moment and the second moment, that the data transmission condition is met, thereby improving precision of data stream transmission between the first device and the second device and user experience. The first moment and the second moment each are obtained based on the time point at which the receiving device in the head-mounted device receives the target signal. The first moment and the second moment each may be represented as time information, or information related to the receiving time point, for example, relative time information generated based on the time point; and are used to learn of the time point at which the signal is received or a related time relationship of the signal is received. A moment subsequently mentioned in this application is also obtained in a similar manner, to reflect time information or a time relationship.

In some possible implementations, when the second device is a headset, the second device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the second device is glasses, the second device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, the first receiving device and the second receiving device are symmetrically disposed on a left side and a right side of the second device; and the determining, based on the first moment and the second moment, that a data transmission condition is met includes: determining that an absolute value of a difference between the first moment and the second moment is less than a preset value.

The left side and the right side of the second device may be determined based on correspondences between the second device and the left and right ears of a user during wearing. Specifically, the left side and the right side may be distinguished based on a central axis cut line or a central axis vertical plane, of the second device, determined based on a face orientation when the second device is worn, as shown in FIG. 6. For the glasses, the left side and the right side are also distinguished according to a similar rule.

It can be learned that, in this implementation, when the absolute value of the difference between the first moment and the second moment is less than the preset value, it may be determined that the second device is likely to face the first device, and it indicates that the user intends the second device to transmit the data stream to the first device. In this case, the first device transmits the target data stream to the second device, thereby improving precision of data stream transmission.

In some possible implementations, the second device further includes a third receiving device, and the third receiving device and the first receiving device are located at different positions of the second device, so that when the second device is worn, the first receiving device and the third receiving device present different position front-to-back relationships in a user face orientation; and the method further includes: obtaining a third moment, where the third moment is obtained based on a time point at which the third receiving device receives the first target signal; and the when determining, based on the first moment and the second moment, that a data transmission condition is met, transmitting a target data stream to the second device includes: when it is determined that the data transmission condition is met based on the first moment and the second moment and the first moment and the third moment meet a preset value relationship, transmitting the target data stream to the second device.

It can be learned that, in this implementation, the second device further includes the third receiving device. In this way, when the absolute value of the difference between the first moment and the second moment is less than the preset value, whether the second device faces the first device can be accurately determined based on the third moment at which the third receiving device receives the first target signal, thereby avoiding a mirror problem. A specific disposing manner may be as follows: When the third receiving device and the first receiving device are disposed on a same side of the first device, the third receiving device is located in front of the first receiving device, the absolute value of the difference between the first moment and the second moment is less than the preset value, and the third moment is earlier than the first moment, it may be determined that the second device faces the first device, that is, the user wearing the second device faces the first device; or when the third moment is later than the first moment, it may be determined that the second device does not face the first device, that is, the user wearing the second device is back to the first device in this case. Therefore, when determining, based on the first moment, the second moment, and the third moment, that the second device faces the first device, the first device transmits the target data stream to the second device. The transmission is in line with a real intention of the user, thereby improving precision of data stream transmission. A front-back relationship between the first receiving device and the third receiving device is determined based on the face orientation when the second device is worn. As shown in FIG. 8*a*, if a mapping point of a third device in a face orientation is B, and a mapping point of a first receiving device in the face orientation is A, it is considered that the third receiving device is in front of the first receiving device.

In some possible implementations, the method further includes: the first receiving device and the second receiving device are symmetrically disposed on the left side and the right side of the second device; sending a second target signal; obtaining a fourth moment, where the fourth moment is obtained based on a time point at which the first receiving device receives the second target signal; and obtaining a fifth moment, where the fifth moment is obtained based on a time point at which the second receiving device receives the second target signal; and the determining, based on the first moment and the second moment, that a data transmission condition is met includes: determining that the absolute value of the difference between the first moment and the second moment is less than the preset value, and an absolute value of a difference between the fourth moment and the fifth moment is less than the preset value.

It can be learned that, in this implementation, in addition to sending the first target signal to the second device, the first device further sends the second target signal to the second device, and comprehensively determines, with reference to the moments at which the receiving devices on the second device receive the first target signal and moments at which the receiving devices on the second device receive the second target signal, whether the data transmission condition is met, so that a determining result is more accurate, thereby improving precision of data stream transmission.

In some possible implementations, before the sending a first target signal, the method further includes: detecting a first preset event, where the first preset event includes at least one of the following: a video playing event, used to indicate video playing, an audio playing event, used to indicate audio playing, an incoming call event, an outgoing call event; or receiving target request information sent by the second device.

It can be learned that, in this implementation, when the first preset event is triggered on the first device, the first device can automatically send the first target signal to the second device, to transmit the target data stream to the second device, and a user does not need to manually establish a connection between the first device and the second device, thereby improving convenience of data stream transmission and user experience.

In some possible implementations, the determining, based on the first moment and the second moment, that a data transmission condition is met includes: determining, based on the first moment and the second moment, that the data transmission condition is met, and obtaining a switching instruction of a user.

It can be learned that, in this implementation, after determining, based on the first moment and the second moment, that the data transmission condition is met, the first device can output prompt information to indicate the user to confirm whether to transmit the target data stream, and transmit the target data to the second device when receiving the switching instruction. After the user is confirmed, the data stream transmission meets a requirement of the user, and has high precision.

In some possible implementations, after the transmitting a target data stream to the second device, the method further includes: displaying a switching list on the first device, where the switching list is used to display a device identifier of at least one candidate user device; obtaining an operation instruction for a device identifier of a first candidate user device in the at least one candidate user device; and sending indication information to the first candidate user device in response to the operation instruction, where the indication information indicates the first candidate user device to transmit a data stream to the second device.

For example, when the second device currently performs data stream transmission with a computer, a mobile phone is in an incoming call, and the mobile phone is not next to the user, the user can select an identifier of the mobile phone on the computer, to switch a headset connection to the mobile phone, and answer the incoming call on the mobile phone without fetching the mobile phone, thereby improving user experience. It can be learned that, in this implementation, after the first device transmits the data stream to the second device, the switching list can be displayed on the first device. In this way, the user can select any device in the switching list to perform manual switching, thereby improving convenience of switching the connection to the second device.

According to a second aspect, an embodiment of this application provides a data stream transmission method, applied to a second device, where the second device is a head-mounted device, the second device includes a first receiving device and a second receiving device, and the first receiving device and the second receiving device are located at different positions of the second device. The method includes: detecting a first target signal sent by a first device; obtaining a first moment, where the first moment is obtained based on a time point at which the first receiving device receives the first target signal; obtaining a second moment, where the second moment is obtained based on a time point at which the second receiving device receives the first target signal; when determining, based on the first moment and the second moment, that a data transmission condition is met, sending first indication information to the first device; and receiving a target data stream transmitted by the first device in response to the first indication information.

Optionally, the first target signal may carry indication information, and the second device may parse a received signal. When obtaining, through parsing, the indication information from a signal, the second device determines, based on the indication information, that the first target signal is detected.

In this implementation of this application, the first device may be any user device that has a capability of playing, receiving, and sending audio and video data and a capability of performing a voice or video call, and the second device is a head-mounted device that has a capability of receiving and playing a data stream, for example, receiving and playing audio data. When data needs to be transmitted between the first device and the second device, the data is not directly transmitted. Instead, the second device determines, based on the first moment and the second moment, that the data transmission condition is met, and sends the first indication information to the first device, to indicate, by using the first indication information, the first device to transmit the data stream to the second device only when the first device transmits the data stream to the second device, thereby improving precision of data transmission between the first device and the second device.

In some possible implementations, when the second device is a headset, the second device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the second device is glasses, the second device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, the first receiving device and the second receiving device are symmetrically disposed on a left side and a right side of the second device; and the determining, based on the first moment and the second moment, that a data transmission condition is met includes: determining that an absolute value of a difference between the first moment and the second moment is less than a preset value.

The left side and the right side of the second device may be determined based on correspondences between the second device and the left and right ears of a user during wearing. Specifically, the left side and the right side may be distinguished based on a central axis cut line or a central axis vertical plane, of the second device, determined based on a face orientation when the second device is worn, as shown in FIG. 6. For the glasses, the left side and the right side are also distinguished according to a similar rule.

It can be learned that, in this implementation, when the absolute value of the difference between the first moment and the second moment is less than the preset value, it may be determined that the second device is likely to face the first device, and it indicates that the user intends the second device to transmit the data stream to the first device. In this case, the second device sends the first indication information to the first device, to indicate to transmit the data stream, thereby improving precision of data stream transmission.

In some possible implementations, the second device further includes a third receiving device, and the third receiving device, the first receiving device, and the second receiving device are located at different positions of the second device, so that when the second device is worn, the first receiving device and the third receiving device present different front-to-back position relationships in a user face orientation; and the method further includes: obtaining a third moment, where the third moment is obtained based on a time point at which the third receiving device receives the first target signal; and the when determining, based on the first moment and the second moment, that a data transmission condition is met, sending first indication information to the first device includes: when it is determined that the data transmission condition is met based on the first moment and the second moment and the first moment and the third moment meet a preset value relationship, sending the first indication information to the first device.

It can be learned that, in this implementation, the second device further includes the third receiving device. When the absolute value of the difference between the first moment and the second moment is less than the threshold, whether the second device faces the first device can be accurately determined based on the third moment at which the third receiving device receives the first target signal, thereby avoiding a mirror problem. A specific disposing manner of the third device may be as follows: When the third receiving device and the first receiving device are disposed on a same side of the second device, the third receiving device is located in front of the first receiving device, the absolute value of the difference between the first moment and the second moment is less than the preset value, and the third moment is earlier than the first moment, it may be determined that the second device faces the first device, that is, the user wearing the second device faces the first device; or when the third moment is later than the first moment, it may be determined that the second device does not face the first device, that is, the user wearing the second device is back to the first device in this case. For another example, when the third receiving device and the first receiving device are disposed on a same side of the second device, and the third receiving device is located behind the first receiving device, when the absolute value of the difference between the first moment and the second moment is less than the preset value, and the third moment is later than the first moment, it may be determined that the second device faces the first device. Therefore, when determining, based on the first moment, the second moment, and the third moment, that the second device faces the first device, the first device sends the first indication information to the first device, to indicate the first device to transmit the data stream to the second device. In this case, the transmitted data stream is in line with a real intention of the user, thereby improving precision of data stream transmission. A front-back relationship between the first receiving device and the third receiving device is determined based on the face orientation when the second device is worn. As shown in FIG. 8a, if a mapping point of a third device in a face orientation is B, and a mapping point of a first receiving device in the face orientation is A, it is considered that the third receiving device is in front of the first receiving device.

In some possible implementations, the method further includes: the first receiving device and the second receiving device are symmetrically disposed on the left side and the right side of the second device; detecting a second target signal sent by the first device; obtaining a fourth moment, where the fourth moment is obtained based on a time point at which the first receiving device receives the second target signal; and obtaining a fifth moment, where the fifth moment is obtained based on a time point at which the second receiving device receives the second target signal; and the determining, based on the first moment and the second moment, that a data transmission condition is met includes: determining that the absolute value of the difference between the first moment and the second moment is less than the preset value, and an absolute value of a difference between the fourth moment and the fifth moment is less than the preset value.

It can be learned that, in this implementation, in addition to sending the first target signal to the second device, the first device further sends the second target signal to the second device, and the second device comprehensively determines, based on the moments at which the first target signal is received and the moments at which the second target signal is received, whether the data transmission condition is met, so that a determining result is more accurate, thereby improving precision of data stream transmission.

In some possible implementations, before the detecting a first target signal sent by a first device, the method further includes: detecting a second preset event; and sending a target request message of the first target signal to the first device in response to the second preset event.

For example, the request message is used to request the first device to send the first target signal to the second device.

It can be learned that, in this implementation, the user can actively trigger the second preset event on the second device, to trigger a process of determining whether the second device can perform data stream transmission with the first device, thereby increasing flexibility of triggering data stream transmission.

In some possible implementations, the second preset event includes: a control operation on a button on the second device.

For example, the button may be an existing button on the second device, for example, a volume adjustment button or a power-on button. When the user presses and holds the button without releasing the hand, the second device may detect the second preset event. Alternatively, the button may be a button that is newly added to the second device and that is used to trigger the second preset event.

In addition, when the second device has a touch panel, the second preset event may be a touch operation on the touch panel, for example, a touch operation on a virtual button or a preset gesture on the touch panel. When the second device has a voice recognition module, the second preset event may be a voice instruction. A type of the second preset event is not limited in this application.

According to a third aspect, an embodiment of this application provides a data stream transmission method, applied to a second device, where the second device is a head-mounted device, the second device includes a first receiving device and a second receiving device, and the first receiving device and the second receiving device are located at different positions of the second device. The method includes: detecting a first target signal sent by a first device; sending a first moment to the first device in response to detecting the first target signal, where the first moment is obtained based on a time point at which the first receiving device receives the first target signal; sending a second moment to the first device in response to detecting the first target signal, where the second moment is obtained based on a time point at which the second receiving device receives the first target signal; and receiving a target data stream transmitted by the first device, where the target data stream is transmitted by the first device to the second device when the first moment and the second moment meet a data transmission condition.

It can be learned that, in this implementation of this application, when data needs to be transmitted between the first device and the second device, the data is not directly transmitted. Instead, the first device determines, based on the first moment and the second moment, that the data transmission condition is met, and sends the data stream to the second device, thereby improving precision of data transmission between the first device and the second device.

In some possible implementations, when the second device is a headset, the second device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the second device is glasses, the second device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, before the detecting a first target signal sent by a first device, the method further includes: detecting a second preset event; and sending a target request message of the first target signal to the first device in response to the second preset event.

It can be learned that, in this implementation, a user may trigger the second preset event on the second device. In this way, a second device side can actively send a data stream transmission request to the first device, and a connection between the second device and the first device can be established without performing any operation on a first device side, thereby increasing diversity of establishing the connection to the first device and improving flexibility of data stream transmission.

In some possible implementations, the second preset event includes: a control operation on a button on the second device.

For example, the button may be an existing button on the second device, for example, a volume adjustment button or a power-on button. When the user presses and holds the button without releasing the hand, the second device may detect the second preset event. Alternatively, the button may be a button that is newly added to the second device and that is used to trigger the second preset event.

In addition, when the second device has a touch panel, the second preset event may be a touch operation on the touch panel, for example, a touch operation on a virtual button or a preset gesture on the touch panel. When the second device has a voice recognition module, the second preset event may be a voice instruction. A type of the second preset event is not limited in this application.

According to a fourth aspect, an embodiment of this application provides a user device. For beneficial effects, refer to the descriptions of the first aspect. Details are not described herein again. The user device has a function of implementing behavior in the method instance in the first aspect. The function may be implemented by hardware, or may be implemented by executing corresponding software by hardware. The hardware or the software includes one or more modules corresponding to the function. In a possible design, the user device includes a processing unit, a sending unit, and a receiving unit; the sending unit is configured to send a first target signal; the processing unit is configured to: obtain a first moment, where the first moment is obtained based on a time point at which a first receiving device on a head-mounted device receives the first target signal; and obtain a second moment, where the second moment is obtained based on a time point at which a second receiving device on the head-mounted device receives the first target signal, and the first receiving device and the second receiving device are located at different positions of the head-mounted device; and when the processing unit determines, based on the first moment and the second moment, that a data transmission condition is met, the processing unit transmits a target data stream to the head-mounted device.

In some possible implementations, when the head-mounted device is a headset, the head-mounted device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the head-mounted device is glasses, the head-mounted device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, the first receiving device and the second receiving device are symmetrically disposed on a left side and a right side of the head-mounted device; and when the processing unit determines, based on the first moment and the second moment, that the data transmission condition is met, the processing unit is specifically configured to: determine that an absolute value of a difference between the first moment and the second moment is less than a preset value.

In some possible implementations, the head-mounted device further includes a third receiving device, where the third receiving device, the first receiving device, and the second receiving device are located at different positions of the head-mounted device, so that when the head-mounted device is worn, the first receiving device and the third receiving device present different front-to-back position relationships in a user face orientation; and the processing unit is further configured to obtain a third moment, where the third moment is obtained based on a time point at which the third receiving device receives the first target signal; and when the processing unit determines, based on the first moment and the second moment, that the data transmission condition is met, and transmits the target data stream to the head-mounted device, the processing unit is specifically configured to: when it is determined that the data transmission condition is met based on the first moment and the second moment and the first moment and the third moment meet a preset value relationship, transmit the target data stream to the head-mounted device.

In some possible implementations, the sending unit is further configured to send a second target signal; the processing unit is further configured to: obtain a fourth moment, where the fourth moment is obtained based on a time point at which the first receiving device receives the second target signal; and obtain a fifth moment, where the fifth moment is obtained based on a time point at which the second receiving device receives the second target signal; and when the processing unit determines, based on the first moment and the second moment, that the data transmission condition is met, the processing unit is specifically configured to: determine that the absolute value of the difference between the first moment and the second moment is less than the preset value, and an absolute value of a difference between the fourth moment and the fifth moment is less than the preset value.

In some possible implementations, before the sending unit sends the first target signal, the processing unit is further configured to: detect a first preset event, where the first preset event includes at least one of the following: a video playing event, used to indicate video playing, an audio playing event, used to indicate audio playing, an incoming call event, an outgoing call event; or control the receiving unit to receive target request information sent by the head-mounted device.

In some possible implementations, when the processing unit determines, based on the first moment and the second moment, that the data transmission condition is met, the processing unit is specifically configured to: determine, based on the first moment and the second moment, that the data transmission condition is met, and obtain a switching instruction of a user.

In some possible implementations, after the processing unit transmits the target data stream to the head-mounted device, the processing unit is further configured to: indicate to display a switching list on the user device, where the switching list is used to display a device identifier of at least one candidate user device; obtain an operation instruction for a device identifier of a first candidate user device in the at least one candidate user device; and indicate, in response to the operation instruction, the sending unit to send indication information to the first candidate user device, where the indication information indicates the first candidate user device to transmit a target data stream to the head-mounted device.

According to a fifth aspect, an embodiment of this application provides a head-mounted device. For beneficial effects, refer to the descriptions of the second aspect. Details are not described herein again. The head-mounted device has a function of implementing behavior in the method instance in the second aspect. The function may be implemented by hardware, or may be implemented by executing corresponding software by hardware. The hardware or the software includes one or more modules corresponding to the function. In a possible design, the head-mounted device includes a first receiving device and a second receiving device, the first receiving device and the second receiving device are located at different positions of the head-mounted device, and the head-mounted device includes one or more processing units, a sending unit, and a receiving unit; the one or more processing units are configured to: detect a first target signal sent by a user device; obtain a first moment, where the first moment is obtained based on a time point at which the first receiving device receives the first target signal; and obtain a second moment, where the second moment is obtained based on a time point at which the second receiving device receives the first target signal; when determining, based on the first moment and the second moment, that a data transmission condition is met, the one or more processing units control the sending unit to send first indication information to the user device; and the receiving unit is configured to receive a target data stream transmitted by the user device in response to the first indication message.

In some possible implementations, when the head-mounted device is a headset, the head-mounted device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the head-mounted device is glasses, the head-mounted device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, the first receiving device and the second receiving device are symmetrically disposed on a left side and a right side of the head-mounted device; and when the one or more processing units determine, based on the first moment and the second moment, that the data transmission condition is met, the one or more processing units are specifically configured to: determine that an absolute value of a difference between the first moment and the second moment is less than a preset value.

In some possible implementations, the head-mounted device further includes a third receiving device, where the third receiving device, the first receiving device, and the second receiving device are located at different positions of the head-mounted device, so that when the head-mounted device is worn, the first receiving device and the third receiving device present different front-to-back position relationships in a user face orientation; and the one or more processing units are further configured to obtain a third moment, where the third moment is obtained based on a time point at which the third receiving device receives the first target signal; and when the one or more processing units determine, based on the first moment and the second moment, that the data transmission condition is met, and control the sending unit to send the first indication information to the user device, the one or more processing units are specifically configured to: when it is determined that the data transmission condition is met based on the first moment and the second moment and the first moment and the third moment meet a preset value relationship, control the sending unit to send the first indication information to the user device.

In some possible implementations, the first receiving device and the second receiving device are symmetrically disposed on a left side and a right side of the head-mounted device; the one or more processing units are further configured to: detect a second target signal sent by the user device; obtain a fourth moment, where the fourth moment is obtained based on a time point at which the first receiving device receives the second target signal; and obtain a fifth moment, where the fifth moment is obtained based on a time point at which the second receiving device receives the second target signal; and when the one or more processing units determine, based on the first moment and the second moment, that the data transmission condition is met, the one or more processing units are specifically configured to: determine that the absolute value of the difference between the first moment and the second moment is less than the preset value and an absolute value of a difference between the fourth moment and the fifth moment is less than the preset value.

In some possible implementations, before the one or more processing units detect the first target signal sent by the user device, the one or more processing units are further configured to: detect a second preset event; and send a target request message of the first target signal to the user device in response to the second preset event.

In some possible implementations, the second preset event includes: a control operation on a button on the head-mounted device.

According to a sixth aspect, an embodiment of this application provides a head-mounted device. For beneficial effects, refer to the descriptions of the third aspect. Details are not described herein again. The second device has a function of implementing behavior in the method instance in the third aspect. The function may be implemented by hardware, or may be implemented by executing corresponding software by hardware. The hardware or the software includes one or more modules corresponding to the function. In a possible design, the head-mounted device includes a first receiving device and a second receiving device, the first receiving device and the second receiving device are located at different positions of the head-mounted device, and the head-mounted device includes one or more processing units, a sending unit, and a receiving unit; the one or more processing units are configured to: detect a first target signal sent by a user device; control, in response to detecting the first target signal, the sending unit to send a first moment to the user device, where the first moment is obtained based on a time point at which the first receiving device receives the first target signal; and control, in response to detecting the first target signal, the sending unit to send a second moment to the user device, where the second moment is obtained based on a time point at which the second receiving device receives the first target signal; and the receiving unit is configured to receive a target data stream transmitted by the user device, where the target data stream is transmitted by the user device to the head-mounted device when the first moment and the second moment meet a data transmission condition.

In some possible implementations, when the head-mounted device is a headset, the head-mounted device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the head-mounted device is glasses, the head-mounted device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, before the one or more processing units detect the first target signal sent by the user device, the one or more processing units are further configured to: detect a second preset event; and control, in response to the second preset event, the sending unit to send a target request message of the first target signal to the user device.

In some possible implementations, the second preset event includes: a control operation on a button on the head-mounted device.

According to a seventh aspect, an embodiment of this application provides a data stream transmission method, applied to a first device, including:

sending a first target signal;

receiving first indication information, where the first indication information is sent to the first device when a first moment and a second moment meet a data transmission condition, the first moment is obtained by a second device based on a time point at which a first receiving device on the second device receives the first target signal, and the second moment is obtained by the second device based on a time point at which a second receiving device on the second device receives the first target signal; and transmitting a target data stream to the second device in response to receiving the first indication information.

In this implementation of this application, the first device may be any user device that has a capability of playing, receiving, and sending audio and video data and a capability of performing a voice or video call, and the second device is a head-mounted device that has a capability of receiving and playing a data stream, for example, receiving and playing audio data. It can be learned that, when the first device needs to transmit data to the second device, the first device does not directly transmit the data to the second device, but sends the first target signal to the second device, and when receiving the first indication information sent by the second device, that is, when the data transmission condition is met, the first device transmits the target data stream to the second device, thereby improving precision of data stream transmission between the first device and the second device and user experience. In addition, the second device determines whether the data transmission condition is met, thereby reducing computing pressure of the first device.

In some possible implementations, when the second device is a headset, the second device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the second device is glasses, the second device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, the method further includes: sending a second target signal.

Correspondingly, the second device receives the second target signal, and obtains a fourth moment and a fifth moment, where the fourth moment is obtained based on a time point at which the first receiving device receives the second target signal, and the fifth moment is obtained based on a time point at which the second receiving device receives the second target signal. Then, the second device determines, based on the first moment, the second moment, the fourth moment, and the fifth moment, whether the data transmission condition is met. Therefore, the first device sends the two target signals, so that the second device comprehensively determines whether the data transmission condition is met, and the second device determines a more accurate result, thereby improving precision of data transmission between the first device and the second device.

In some possible implementations, before the sending a first target signal, the method further includes: detecting a first preset event, where the first preset event includes at least one of the following: a video playing event, used to indicate video playing, an audio playing event, used to indicate audio playing, an incoming call event, an outgoing call event; or receiving target request information sent by the second device.

It can be learned that, in this implementation, when the first preset event is triggered on the first device, the first device can automatically send the first target signal to the second device, to transmit the target data stream to the second device, and a user does not need to manually control data transmission between the first device and the second device, thereby improving convenience of data transmission and user experience.

In some possible implementations, the transmitting a target data stream to the second device in response to receiving the first indication information includes: transmitting the target data stream to the second device in response to receiving the first indication information and obtaining a switching instruction of a user.

It can be learned that, in this implementation, when the first device indicates that the data transmission condition is met, the first device can further output prompt information, so that the user confirms whether to transmit the target data stream; and transmit the target data to the second device only when the switching instruction is received. After the user is confirmed, the data stream transmission meets a requirement of the user, and has high precision.

In some possible implementations, after the transmitting a target data stream to the second device, the method further includes: displaying a switching list on the first device, where the switching list is used to display a device identifier of at least one candidate user device; obtaining an operation instruction for a device identifier of a first candidate user device in the at least one candidate user device; and sending indication information to the first candidate user device in response to the operation instruction, where the indication information indicates the first candidate user device to transmit a data stream to the second device.

For example, when the second device currently performs data stream transmission with a computer, a mobile phone is in an incoming call, and the mobile phone is not next to the user, the user can select an identifier of the mobile phone on the computer, to switch a headset connection to the mobile phone, and answer the incoming call on the mobile phone without fetching the mobile phone, thereby improving user experience. It can be learned that, in this implementation, after the first device transmits the data stream to the second device, the switching list can be displayed on the first device. In this way, the user can select any device in the switching list to perform manual switching, thereby improving convenience of switching the connection to the second device.

According to an eighth aspect, an embodiment of this application provides a user device, including a processing unit, a sending unit, and a receiving unit;

the sending unit is configured to send a first target signal;

the receiving unit is configured to receive first indication information, where the first indication information is sent to the user device when a first moment and a second moment meet a data transmission condition, the first moment is obtained by a head-mounted device based on a time point at which a first receiving device on the head-mounted device receives the first target signal, and the second moment is obtained by the head-mounted device based on a time point at which a second receiving device on the head-mounted device receives the first target signal; and the processing unit is configured to transmit a target data stream to the head-mounted device in response to receiving the first indication information.

In some possible implementations, when the head-mounted device is a headset, the head-mounted device includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit; or when the head-mounted device is glasses, the head-mounted device includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In some possible implementations, before the receiving unit receives the first indication information, the sending unit is further configured to send a second target signal.

In some possible implementations, before the sending unit sends the first target signal, the processing unit is further configured to: detect a first preset event, where the first preset event includes at least one of the following: a video playing event, used to indicate video playing, an audio playing event, used to indicate audio playing, an incoming call event, an outgoing call event; or control the receiving unit to receive target request information sent by the head-mounted device.

In some possible implementations, if the processing unit transmits the target data stream to the head-mounted device in response to receiving the first indication information, the processing unit is specifically configured to transmit the target data stream to the head-mounted device in response to receiving the first instruction information and obtaining a switching instruction of a user.

In some possible implementations, after the processing unit transmits the target data stream to the head-mounted device, the processing unit is further configured to: indicate to display a switching list on the first device, where the switching list is used to display a device identifier of at least one candidate user device; obtain an operation instruction for a device identifier of a first candidate user device in the at least one candidate user device; and send indication information to the first candidate user device in response to the operation instruction, where the indication information indicates the first candidate user device to transmit the data stream to the head-mounted device.

According to a ninth aspect, an embodiment of this application provides a computer-readable medium. The computer-readable medium stores program code executed by a device, and the program code is used to cooperate with a receiving unit and/or a sending unit to implement the method in the first aspect, the second aspect, the third aspect, or the seventh aspect.

According to a tenth aspect, an embodiment of this application provides a computer program product including instructions. When the computer program product runs on a user device or a head-mounted device, the user device or the head-mounted device is enabled to implement the method in the first aspect, the second aspect, the third aspect, or the seventh aspect.

According to an eleventh aspect, an embodiment of this application provides a chip. The chip includes a processor and a data interface, and the processor reads, through the data interface, instructions stored in a memory, to implement the method in the first aspect, the second aspect, the third aspect, or the seventh aspect.

Optionally, in an implementation, the chip may further include the memory, the memory stores the instructions, the processor is configured to execute the instructions stored in the memory, and when the instructions are executed, the processor is configured to implement the method in the first aspect, the second aspect, the third aspect, or the seventh aspect.

DESCRIPTION OF EMBODIMENTS

Figure 1:
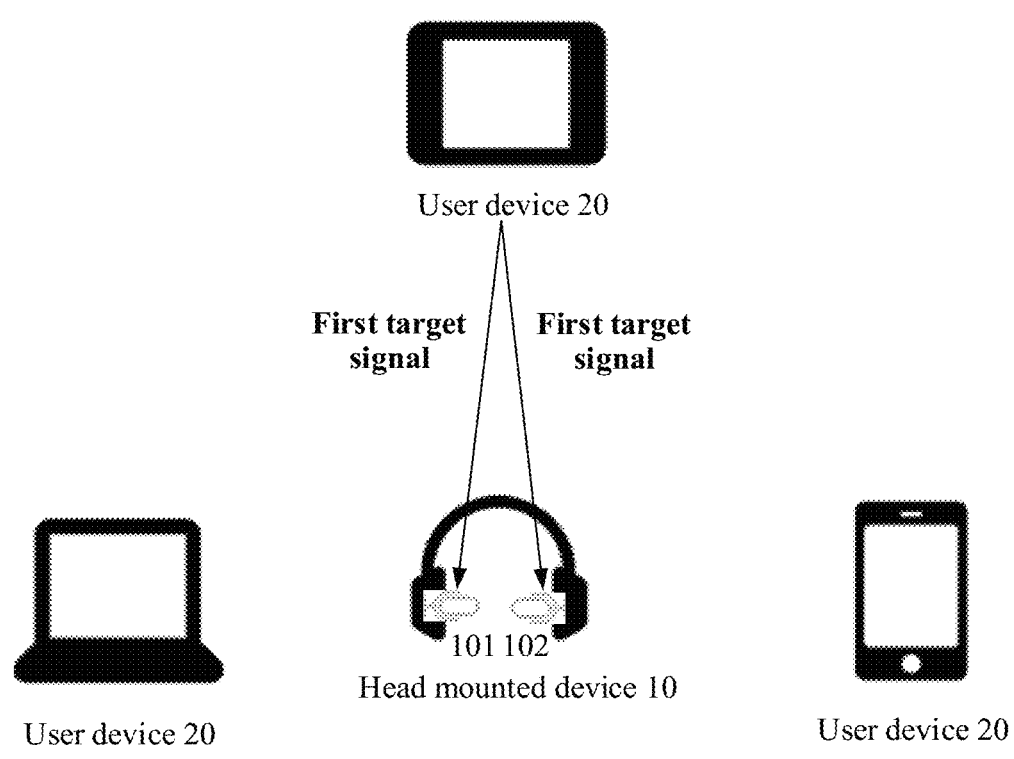
FIG. 1 is an architectural diagram of a data stream transmission system according to an embodiment of this application.

It is first noted that a first device in this application may be a user device, and the first device is used as the user device for description subsequently. The user device may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self-driving (self-driving), or a wireless terminal in telemedicine (remote medical). A second device in this application may be a head-mounted device, and the second device is used as the head-mounted device for description subsequently. Optionally, the head-mounted device includes but is not limited to a headset, glasses, or a helmet. For example, the head-mounted device may be a wireless head-set, virtual reality (Virtual Reality, VR) glasses, or a VR helmet. The head-mounted device includes a first receiving device and a second receiving device, and the first receiving device and the second receiving device are located at different positions of the head-mounted device. Optionally, the first receiving device and the second receiving device may be symmetrically disposed on the head-mounted device, or may be asymmetrically disposed on the head-mounted device. The symmetric disposing of the first receiving device and the second receiving device may be understood as totally symmetric disposing, that is, the first receiving device and the second receiving device are disposed on a left side and a right side of the head-mounted device in a mirror manner; or may be understood as there is an offset between a left side and a right side of the head-mounted device, for example, the first receiving device is disposed at a position 1, a mirror position corresponding to the position 1 is a position 2, and the second receiving device is not disposed at the position 2, but is disposed near the position 2. This disposing manner may also be referred to as symmetric disposing. Therefore, positions of the first receiving device and the second receiving device are not limited in this application.

Optionally, when the head-mounted device is the headset, the head-mounted device further includes a left sound-making unit and a right sound-making unit; a distance between the first receiving device and the left sound-making unit is shorter than a distance between the first receiving device and the right sound-making unit; and a distance between the second receiving device and the right sound-making unit is shorter than a distance between the second receiving device and the left sound-making unit. Optionally, when the head-mounted device is the glasses, the head-mounted device further includes a left frame temple and a right frame temple; a distance between the first receiving device and the left frame temple is shorter than a distance between the first receiving device and the right frame temple; and a distance between the second receiving device and the right frame temple is shorter than a distance between the second receiving device and the left frame temple.

In addition, a data stream transmission process is mainly described in this application by using an example in which the head-mounted device is the headset.

The following describes technical solutions of this application with reference to accompanying drawings.

FIG. 1 is an architectural diagram of a data stream transmission system according to an embodiment of this application. As shown in FIG. 1, the data stream transmission system includes a head-mounted device 10 and user devices 20. The head-mounted device 10 includes a first receiving device 101 and a second receiving device 102, and the head-mounted device 10 includes the first receiving device 101 and the second receiving device 102.

For example, the user device 20 detects a first preset event, and sends a first target signal to the head-mounted device 10.

Optionally, the head-mounted device 10 obtains a first moment and a second moment in response to detecting the first target signal, where the first moment is obtained based on a time point at which the first receiving device 101 receives the first target signal, and the second moment is obtained based on a time point at which the second receiving device 102 receives the first target signal. When determining, based on the first moment and the second moment, that a data transmission condition is met, the head-mounted device 10 sends first indication information to the user device 20, where the first indication information indicates the user device 20 to transmit a target data stream to the head-mounted device 10. The user device 20 transmits the target data stream to the head-mounted device 10 in response to the first indication information. Correspondingly, the head-mounted device 10 obtains the target data stream transmitted by the user device 20.

Optionally, the head-mounted device 10 obtains the first moment and the second moment in response to detecting the first target signal, and sends the first moment and the second moment to the user device 20. When determining, based on the first moment and the second moment, that the data transmission condition is met, the user device 20 transmits the target data stream to the head-mounted device 10. Correspondingly, the head-mounted device 10 obtains the target data stream transmitted by the user device 20.

It can be learned that in this embodiment of this application, the user device 20 sends the first target signal to the head-mounted device 10 when detecting the first preset event, and the user device 20 transmits the target data stream to the head-mounted device 10 only when the user device 20 or the head-mounted device 10 determines, based on the first moment and the second moment, that the data transmission condition is met, instead of directly transmitting the data stream to the head-mounted device 10 when detecting a key event, thereby improving data stream transmission precision and user experience.

Figure 2:
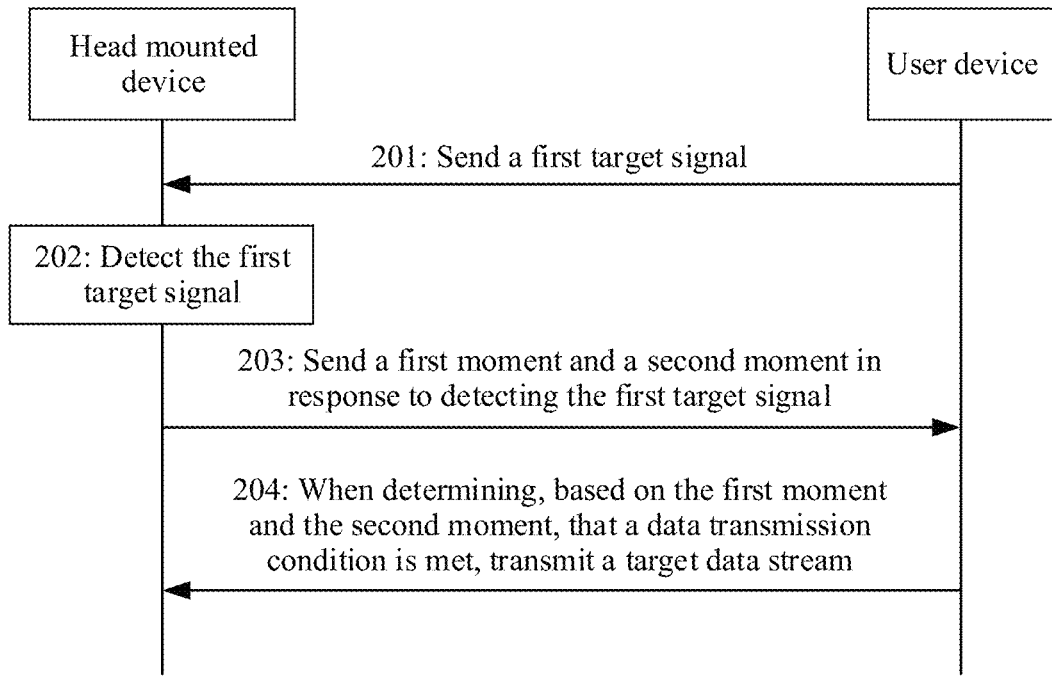
FIG. 2 is a schematic flowchart of a data stream transmission method according to an embodiment of this application.

FIG. 2 is a schematic flowchart of a data stream transmission method according to an embodiment of this application. The method is applied to the data stream transmission system shown in FIG. 1. The method includes content of the following steps.

201: A user device sends a first target signal to a head-mounted device.

Optionally, before sending the first signal, the user device detects a first preset event, where the first preset event may be directly triggered on the user device, or may be obtained from a head-mounted device side.

For example, when the first preset event is triggered on the user device, the first preset event may be at least one of the following: a video playing event, used to indicate video playing; an audio playing event, used to indicate audio playing, where an audio includes a voice message, music, and other audios; an incoming call event; or an outgoing call event, where a call includes a voice call and a video call. When the first preset event is execution of the foregoing specific event on the user device, a feasible implementation of this solution may be as follows: After detecting the first preset event, the user device first sends one piece of indication information to the head-mounted device to trigger the head-mounted device to start to detect a signal of a specific type (the first target signal), and then sends the first target signal to the head-mounted device. The indication information may be any agreed message, for example, a request message. Because the user device and the head-mounted device needs to establish a short-range wireless connection, for example, a Bluetooth connection, in advance for message transmission, during implementation of this solution, after detecting the first preset event, the user device may send the indication information to the head-mounted device that establishes the short-range wireless connection to the user device, or send the indication information after detecting or connecting to a surrounding head-mounted device.

Alternatively, the first preset event may be receiving target request information sent by the head-mounted device, where the target request information is any specified information agreed upon by the head-mounted device and the user device; and the user device sends the first target signal to the head-mounted device after receiving the target request information, where the target request information may be used to request the user device to send the first target signal to the head-mounted device. In this case, when the head-mounted device sends the target request information, the head-mounted device simultaneously or subsequently enables detection of the first target signal, and waits to receive the first target signal sent by the user device in response to the target request information. Likewise, the Bluetooth connection needs to be established in advance for transmission of the target request information. Therefore, in specific implementation, the head-mounted device may send the target request information to the user device that has established the connection to the head-mounted device, or start a wireless short-range connection establishment procedure, and send the target request information after attempting to connect to the surrounding user device.

Further, when the first preset event is the receiving target request information sent by the head-mounted device, before the head-mounted device sends the target request information, the head-mounted device further detects a second preset event. Correspondingly, the head-mounted device sends the target request message to the user device in response to the second preset event.

For example, the second preset event includes a control operation on a button on the head-mounted device, and the touch operation on the button on the head-mounted device may be tapping the button on the head-mounted device or holding the button on the head-mounted device without releasing the hand. The button may be an existing button on the head-mounted device, for example, a power-on button or a volume adjustment button; or the button may be a newly added button used to trigger the second preset event. A type of the button is not limited.

Optionally, when the head-mounted device has a touch panel, the second preset event may be a touch operation on the touch panel of the head-mounted device. For example, the touch operation may be a preset operation on the touch panel, for example, a detected double-tap operation on the touch panel or a detected "S" drawing operation on the touch panel; or a touch operation on a virtual function button on the touch panel. A type of the preset operation is not limited.

Optionally, when the head-mounted device has a voice recognition module, the second preset event may be a voice instruction used to instruct to transmit the target data stream to the user device. The voice instruction may be a voice instruction used to instruct the head-mounted device to transmit the target data stream to the user device. For example, the voice instruction may be "establishing a connection to the user device" or "transmitting the data stream to the user device". A type of the voice instruction is not limited.

Figure 3:
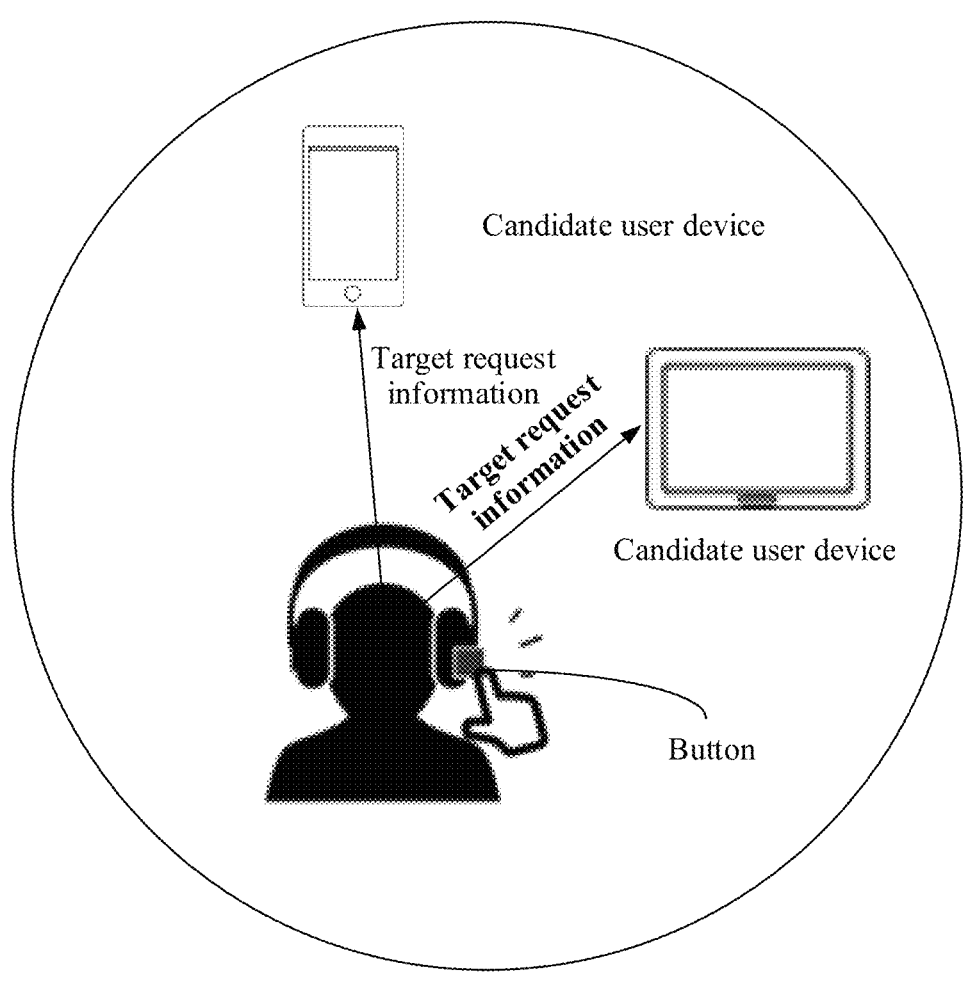
FIG. 3 is a schematic diagram of triggering a second preset event on a head-mounted device according to an embodiment of this application.

For example, as shown in FIG. 3, the head-mounted device is a headset, and a button is newly added to the headset. When the user presses and holds the button without releasing the hand, the headset may detect the second preset event, and send the target request message to the user device.

In addition, after the head-mounted device detects the second preset event, the head-mounted device may first determine at least one candidate user device according to a preset rule, and send the target request information to each candidate user device, where the user device is one of the at least one candidate user device.

For example, the head-mounted device uses a user device that has established a connection to the head-mounted device as the at least one candidate user device; or uses a user device that is in a same local area network as the head-mounted device as the at least one candidate user device; or uses a device within a preset range of the head-mounted device as the at least one candidate user device, for example, uses a user device in an area range that is centered on the head-mounted device and whose radius is R as the at least one candidate user device; or uses a user device that is in a screen-on state and within a preset range of the head-mounted device as the at least one candidate user device.

The first target signal may have different forms based on a hardware type on the head-mounted device. For example, when there is a receiver on the head-mounted device, the first target signal may be an instruction signal, for example, an electromagnetic wave signal, and the user device may send the first target signal to the head-mounted device through an antenna. For another example, when there is a microphone on the head-mounted device, the first target signal may be an ultrasonic signal, and the user device may send the ultrasonic signal to the head-mounted device via a sound-making unit, where the ultrasonic signal may be a chirp signal (Chirp signal) whose frequency is between 17 kHz and 22 kHz. A type of the first target signal is not limited in this application.

Figure 4:
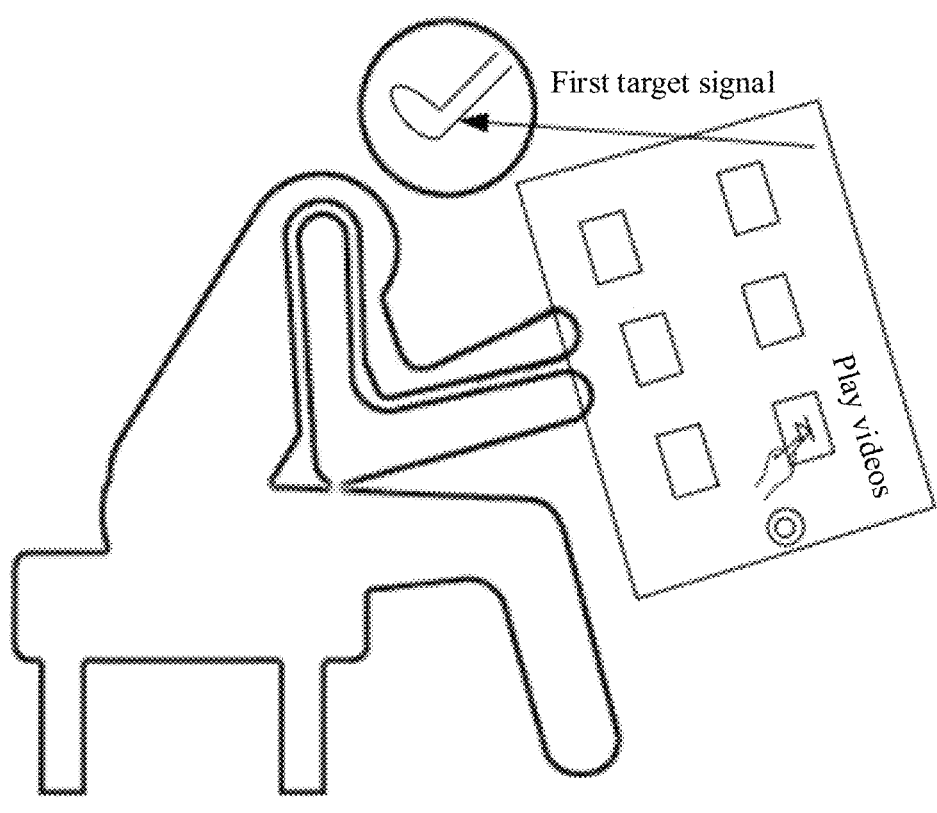
FIG. 4 is a schematic diagram of triggering a first preset event on a user device according to an embodiment of this application.

As shown in FIG. 4, the user wears the headset. When the user starts to play videos on a tablet computer, that is, triggers the first preset event, the tablet computer sends indication information to the headset, to indicate the headset to detect the first target signal. Then, the tablet computer sends the first target signal to the headset via a sound-making unit.

202: The head-mounted device detects the first target signal.

Figure 5:
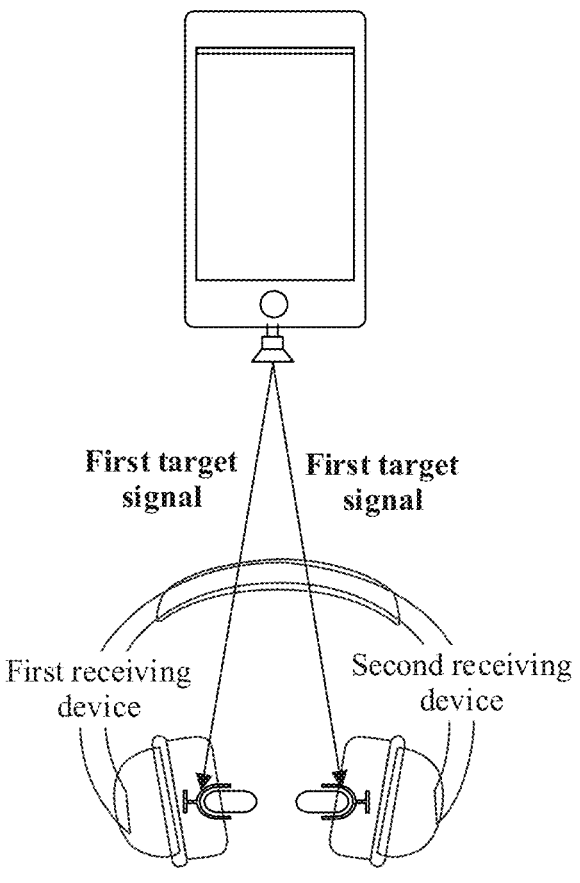
FIG. 5 is a schematic diagram of receiving a first target signal by two microphones according to an embodiment of this application.

For example, the head-mounted device detects the first target signal based on the indication information sent by the user device. It should be noted that because there are a plurality of receiving devices on the head-mounted device, a signal received by each receiving device needs to be detected, to detect that each receiving device receives the first target signal. As shown in FIG. 5, the head-mounted device needs to detect each signal received by a first receiving device, to determine that the first receiving device receives the first target signal, and detect each signal received by a second receiving device, to determine that the second receiving device receives the first target signal.

For example, based on different types of the first target signal, manners of detecting the first target signal are different. Optionally, when the first target signal is the instruction signal, the first target signal carries indication information, where the indication information indicates that the first target signal is a signal of an agreed specific type. Therefore, after receiving the first target signal, the head-mounted device parses the first target signal to obtain the indication information, and detects the first target signal based on the indication information. Optionally, when the first target signal is the ultrasonic signal, the head-mounted device performs matched filtering on the received ultrasonic signal and a stored ultrasonic signal template, and uses an ultrasonic signal whose matching value is greater than a threshold as the first target signal.

203: The head-mounted device sends a first moment and a second moment to the user device in response to detecting the first target signal, where the first moment is obtained based on a time point at which the first receiving device receives the first target signal, and the second moment is obtained based on a time point at which the second receiving device receives the first target signal.

The first moment may be the time point at which the first receiving device receives the first target signal, or may be obtained by processing the time point at which the first receiving device receives the first target signal. For example, an offset is added to the time point at which the first receiving device receives the first target signal, to obtain the first moment. Likewise, manners of obtaining the second moment, and the following third moment, fourth moment, and fifth moment are similar to a manner of obtaining the first moment, and details are not described again. It should be noted that if both the first moment and the second moment are obtained by processing the time points at which the first target signal is received, it needs to be ensured that same processing is performed on the time point at which the first receiving device receives the first target signal and the time point at which the second receiving device receives the first target signal, for example, a same offset is added. In this application, descriptions are provided by using an example in which the first moment, the second moment, the third moment, the fourth moment, and the fifth moment are all time points at which receiving devices on the head-mounted device receive the target signal.

For example, for the instruction signal, the head-mounted device may first buffer time points at which the first receiving device and the second receiving device receive a signal instruction. When obtaining, through parsing, that an instruction signal is the first target signal, the head-mounted device reads, from a buffer, the time point at which the first receiving device receives the first target signal and the time point at which the second receiving device receives the second target signal, to obtain the first moment and the second moment.

For example, for the ultrasonic signal, the head-mounted device performs matched filtering on the ultrasonic signal received by the first receiving device and the stored ultrasonic signal template, to obtain a matching result. The matching result is represented in a time domain coordinate system as follows: a horizontal coordinate is a time point, namely, a time point at which the ultrasonic signal is received, and a vertical coordinate is a matching degree between the ultrasonic signal received by the first receiving device and the stored ultrasonic signal template. Then, when the matching degree is greater than the threshold, the first target signal is detected, and a time point at which the matching degree is greater than the threshold is used as the first moment. Likewise, the manner of obtaining the second moment is similar to the manner of obtaining the first moment, and details are not described again.

204: When determining, based on the first moment and the second moment, that a data transmission condition is met, the user device transmits a target data stream to the head-mounted device.

Figure 6:
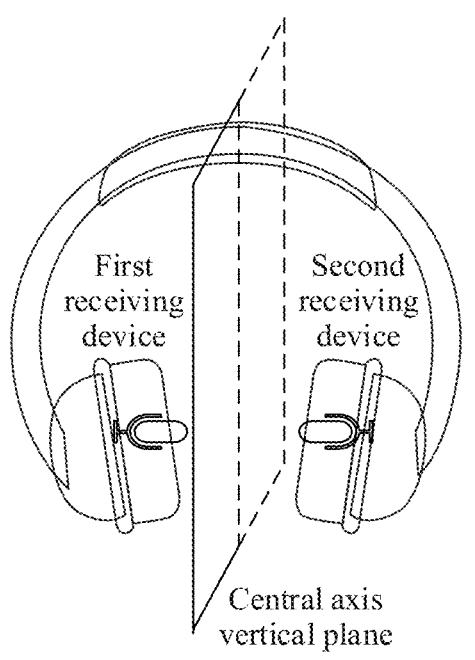
FIG. 6 is a schematic diagram of symmetrically disposing two receiving devices according to an embodiment of this application.

For example, the user device obtains an absolute value of a difference between the first moment and the second moment, and when the absolute value is less than a preset value, determines that the data transmission condition is met. Determining that the data transmission condition is met may be understood as determining that the head-mounted device faces the user device. The preset value is related to relative positions of the first receiving device and the second receiving device on the head-mounted device. For example, when the first receiving device and the second receiving device are symmetrically disposed on a left side and a right side of the head-mounted device, the preset value is close to 0. In other words, when the first receiving device and the second receiving device simultaneously receive the first target signal, it is determined that the head-mounted device faces the user device. As shown in FIG. 6, that the first receiving device and the second receiving device are symmetrically disposed on the left side and the right side of the head-mounted device may be understood as that the first receiving device and the second receiving device are symmetrically disposed on a left side and a right side of a central axis cut line of the head-mounted device or on a left side and a right side of a central axis vertical plane. For another example, when the first receiving device and the second receiving device are asymmetrically disposed, the preset value may be set based on a distance between the first receiving device and a center of the head-mounted device and a distance between the second receiving device and the center of the head-mounted device. In this application, descriptions are mainly provided by using an example in which the first receiving device and the second receiving device are symmetrically disposed on the left side and the right side of the head-mounted device.

Further, after the user device determines that the data transmission condition is met, the user device transmits the target data stream to the head-mounted device, where the target data stream may be audio data. The audio data is transmitted through the connection between the user device and the head-mounted device, for example, a Bluetooth connection.

It can be learned that, in this embodiment of this application, when there is an audio/video playing or call requirement, the user device first sends the first target signal to the head-mounted device; and determines, based on the first moment and the second moment, whether the data transmission condition is met; and if the data transmission condition is met, the user device transmits the data stream to the head-mounted device instead of directly transmitting the data stream to the head-mounted device. Therefore, the data stream transmission method in this application better conforms to a real intention of the user, and improves user experience.

Figure 7:
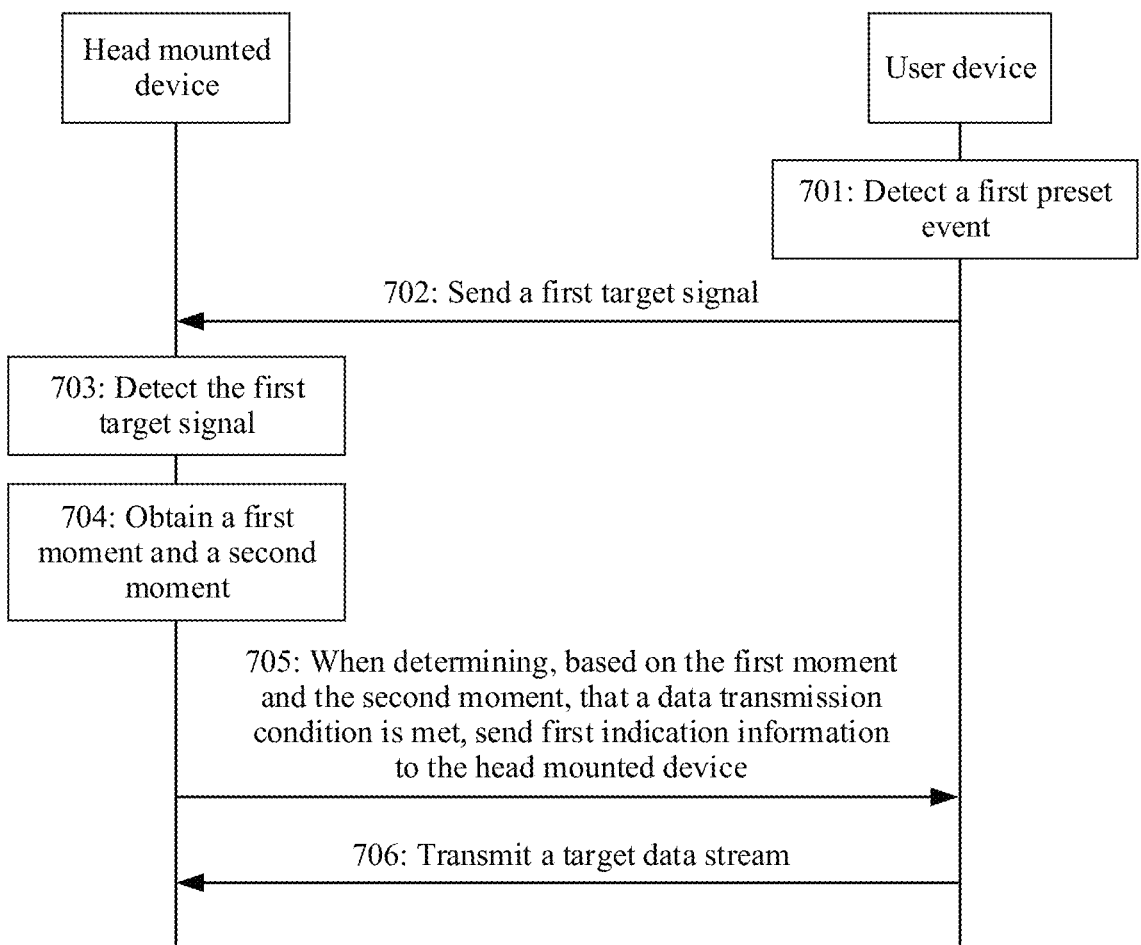
FIG. 7 is a schematic flowchart of another data stream transmission method according to an embodiment of this application.

FIG. 7 is a schematic flowchart of another data stream transmission method according to an embodiment of this application. The method is applied to the data stream transmission system shown in FIG. 1. Content that is repeated between this embodiment and the embodiment shown in FIG. 2 is not described herein again. The method includes content of the following steps.

701: A user device detects a first preset event.

702: The user device sends a first target signal to a head-mounted device.

703: The head-mounted device detects the first target signal.

704: The head-mounted device obtains a first moment and a second moment, where the first moment is obtained based on a time point at which a first receiving device receives the first target signal, and the second moment is obtained based on a time point at which a second receiving device receives the first target signal.

705: When determining, based on the first moment and the second moment, that a data transmission condition is met, the head-mounted device sends first indication information to the user device, where the first indication information indicates the user device to transmit a target data stream to the head-mounted device.

For example, a manner in which the head-mounted device determines that the transmission condition is met is similar to the foregoing manner in which the user device determines that the transmission condition is met, and details are not described again.

Optionally, the first indication information may be agreed by both the head-mounted device and the user device. For example, the first indication information may be indicated by using one bit. For example, it is agreed that a bit "1" indicates that the data transmission condition is met, and it is agreed that a bit "0" indicates that the data transmission condition is not met.

706: The user device transmits the target data stream to the head-mounted device.

Optionally, the user device determines, based on the first indication information, that the data transmission condition is met, and transmits the target data stream to the head-mounted device.

It can be learned that, in this embodiment of this application, when there is an audio playing requirement, the user device sends the first target signal to the head-mounted device. Then, the head-mounted device determines, based on the first moment and the second moment, whether the data transmission condition is met, and if the data transmission condition is met, sends the first indication information to the head-mounted device, to indicate, by using the first indication information, the head-mounted device that the data transmission requirement is met. Correspondingly, the user device transmits the data stream to the head-mounted device only after receiving the first indication information, instead of directly transmitting the data stream to the head-mounted device. Therefore, the data stream transmission method in this application better conforms to a real intention of a user, and improves user experience. In addition, the head-mounted device autonomously determines, based on the first moment and the second moment, whether the data transmission condition is met, and sends a determining result to the user device. In this way, the user device can directly determine, based on the determining result sent by the head-mounted device, whether the head-mounted device meets the data transmission condition, thereby improving data exchange efficiency and reducing computing pressure of the user device.

In an implementation of this application, the head-mounted device further includes a third receiving device, and the first receiving device, the second receiving device, and the third receiving device are located at different positions of the head-mounted device, so that when the head-mounted device is worn, the first receiving device and the third receiving device present different front-to-back position relationships in a user face orientation.

Figures 8A, 8B:
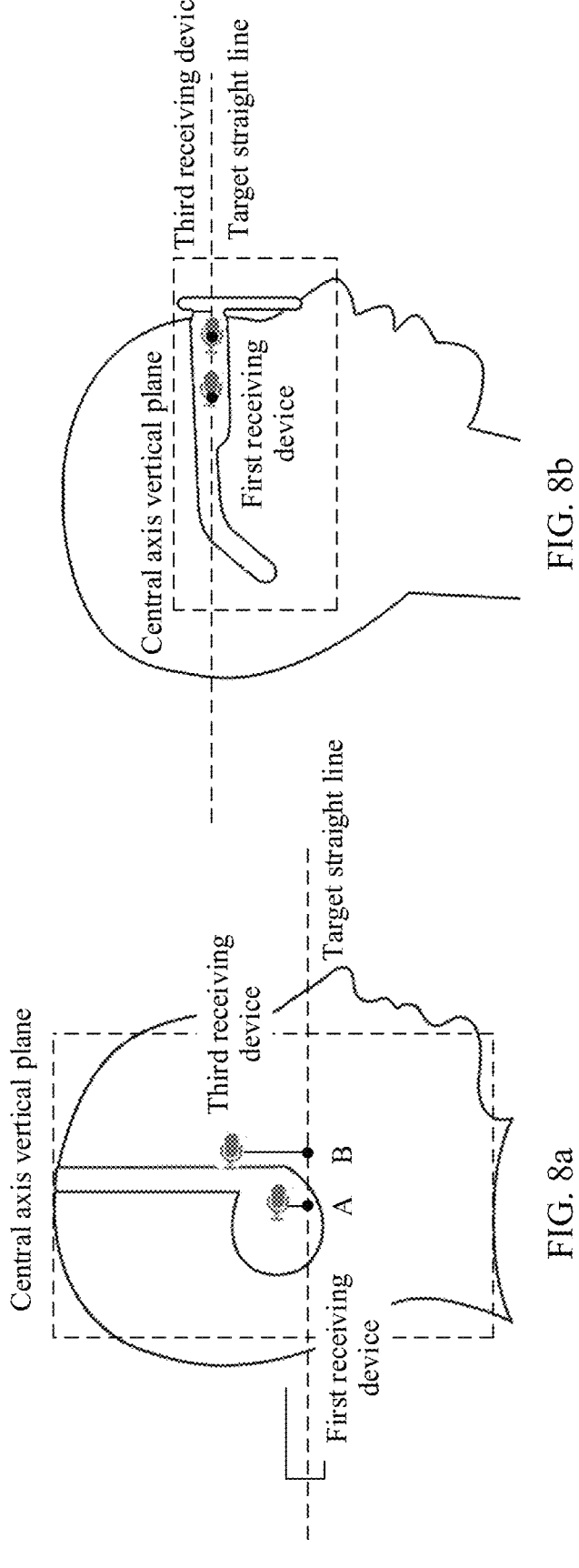
FIG. 8a is a schematic diagram of disposing a third receiving device according to an embodiment of this application.
FIG. 8b is another schematic diagram of disposing a third receiving device according to an embodiment of this application.

It should be noted that, that the first receiving device and the third receiving device present different front-to-back position relationships in the user face orientation may be understood as that a perpendicular point from the third receiving device to a target straight line and a perpendicular point from the first receiving device to the target straight line present different front-to-back position relationships. The target straight line is a straight line parallel to a central axis vertical plane of the head-mounted device, that is, the target straight line may be understood as a straight line parallel to the face orientation. The perpendicular point from the third receiving device to the target straight line may be located before the perpendicular point from the first receiving device to the target straight line, or may be located after the perpendicular point from the first receiving device to the target straight line. This is not limited in this application. As shown in FIG. 8a, a perpendicular point A from a first receiving device to a target straight line and a perpendicular point B from a third receiving device to a target straight line present different front-to-back position relationships, and the point B is located before the point A.

Certainly, because the first receiving device and the second receiving device are symmetrically disposed, similar to the first receiving device, the third receiving device and the second receiving device may also present different front-to-back position relationships in the user face orientation, and details are not described again.

Optionally, to determine an orientation towards which the head-mounted device faces more accurately, when the third receiving device and the first receiving device are disposed on a same side of the head-mounted device, as shown in FIG. 8b, a common design is to make the first receiving device and the second receiving device parallel to the face orientation when the head-mounted device is worn. Likewise, when the third receiving device and the second receiving device are disposed on a same side of the head-mounted device, a common design is to make a connection line between the second receiving device and the third receiving device parallel to the face orientation when the head-mounted device is worn.

Therefore, when the head-mounted device further includes the third receiving device, and the user device determines whether the data transmission condition is met, the head-mounted device further obtains a third moment, and sends the third moment to the user device, where the third moment is obtained based on a time point at which the third receiving device receives the first target signal. Correspondingly, the user device determines, based on the first moment and the second moment, that the data transmission condition is met, and the first moment and the third moment meet a preset value relationship, that is, determines that the head-mounted device faces the user device, the user device transmits the target data stream to the head-mounted device.

Therefore, when the head-mounted device further includes a third receiving device, and the head-mounted device determines whether the data transmission condition is met, the head-mounted device further obtains a third moment, where the third moment is obtained based on a time point at which the third receiving device receives the first target signal; and the head-mounted device determines, based on the first moment and the second moment, that the data transmission condition is met, and the first moment and the third moment meet a preset value relationship, that is, determines that the head-mounted device faces the user device, and sends the first indication information to the head-mounted device. Correspondingly, the user device transmits the target data stream to the head-mounted device based on the first indication information.

With reference to the accompanying drawings, the following describes a manner in which the user device determines, based on the first moment, the second moment, and the third moment, that the head-mounted device faces the user device. A manner in which the head-mounted device determines that the head-mounted device faces the user device is similar to this, and details are not described again.

Figure 9:
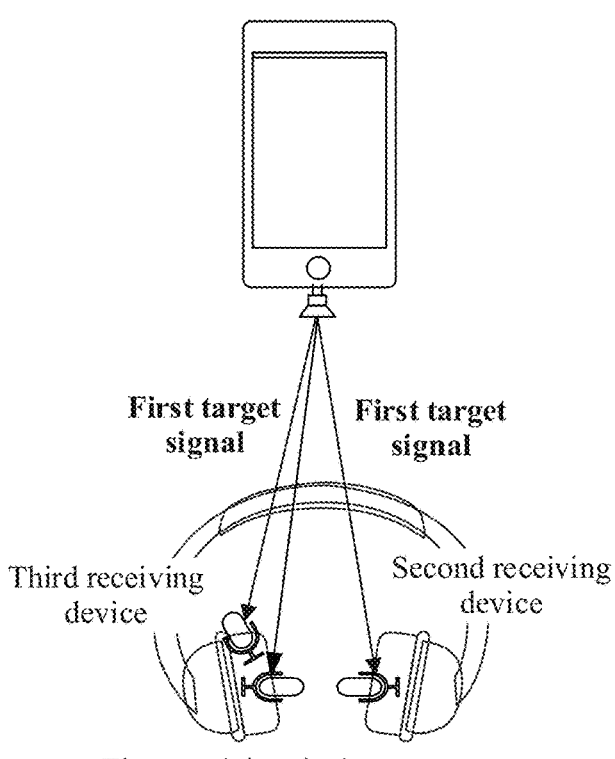
FIG. 9 is a schematic diagram of receiving a first target signal by three receiving devices according to an embodiment of this application.

As shown in FIG. 9, when the third receiving device and the first receiving device are disposed on a same side, the perpendicular point from the third receiving device to the target straight line is located in front of the perpendicular point from the first receiving device to the target straight line, and the headset is worn, the third receiving device receives the first target signal earlier than the first receiving device. Therefore, when the user device determines that the absolute value of the difference between the first moment and the second moment is less than the threshold, and the first moment and the third moment meet the preset value relationship, that is, the third moment is earlier than the first moment, the user device determines that the head-mounted device faces the user device and transmits the target data stream to the head-mounted device. In addition, the third receiving device and the second receiving device may alternatively be disposed on a same side, and the perpendicular point from the third receiving device to the target straight line is located in front of the perpendicular point from the first receiving device to the target straight line. When the headset is worn, the third receiving device receives the first target signal earlier than the second receiving device. Therefore, when the user device determines that the absolute value of the difference between the first moment and the second moment is less than the threshold, and the second moment and the third moment meet the preset value relationship, that is, the third moment is earlier than the second moment, the user device determines that the head-mounted device faces the user device and transmits the target data stream to the head-mounted device.

Figure 10:
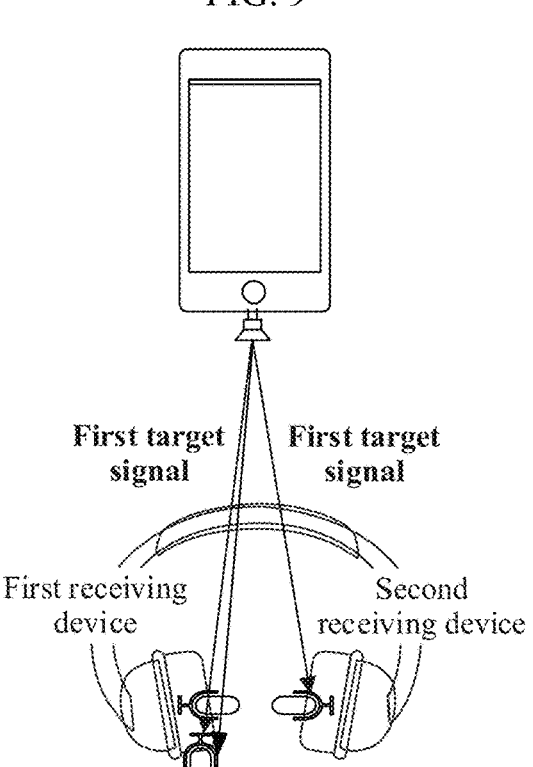
FIG. 10 is another schematic diagram of receiving a first target signal by three receiving devices according to an embodiment of this application.

As shown in FIG. 10, when the third receiving device and the first receiving device are disposed on a same side, the perpendicular point from the third receiving device to the target straight line is located behind the perpendicular point from the first receiving device to the target straight line, and the headset is worn, the third receiving device receives the first target signal later than the first receiving device. Therefore, when the user device determines that the absolute value of the difference between the first moment and the second moment is less than the threshold, and the first moment and the third moment meet the preset value relationship, that is, the third moment is later than the first moment, the user device determines that the head-mounted device faces the user device and transmits the target data stream to the head-mounted device. In addition, the third receiving device and the second receiving device may alternatively be disposed on a same side, and the perpendicular point from the third receiving device to the target straight line is located behind the perpendicular point from the first receiving device to the target straight line. When the headset is worn, the third receiving device receives the first target signal later than the second receiving device. Therefore, when the user device determines that the absolute value of the difference between the first moment and the second moment is less than the threshold, and the second moment and the third moment meet the preset value relationship, that is, the third moment is later than the second moment, the user device determines that the head-mounted device faces the user device and transmits the target data stream to the head-mounted device.

Figure 11:
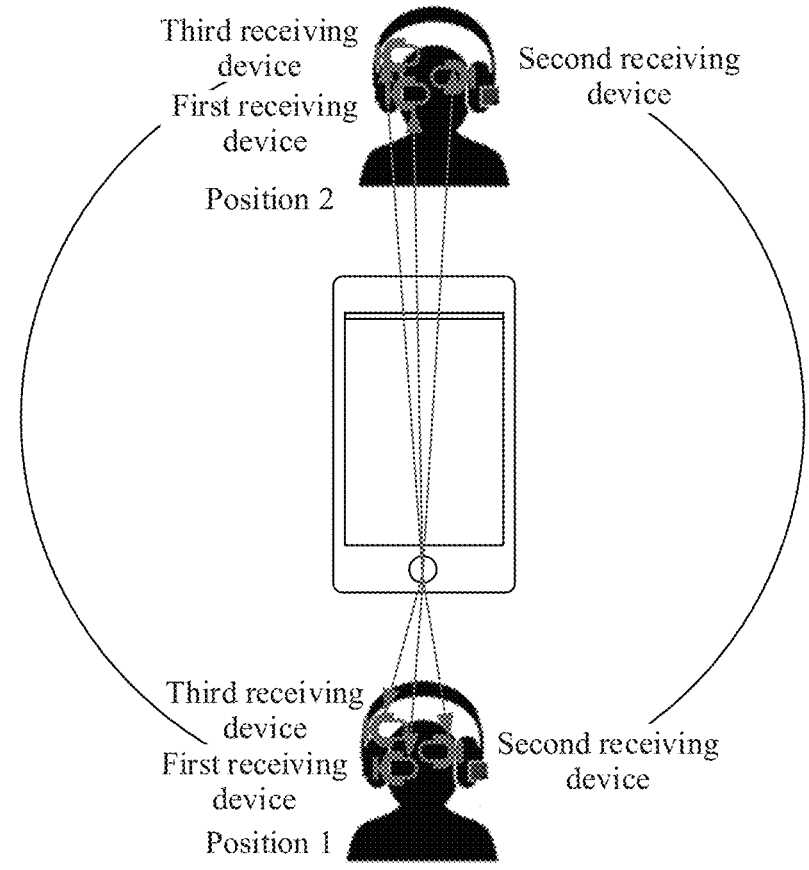
FIG. 11 is a schematic diagram of a mirror position according to an embodiment of this application.

It should be understood that the third receiving device is disposed because whether the head-mounted device faces the user device cannot be accurately determined in the foregoing manner of determining that the transmission condition is met only based on the absolute value of the difference between the first moment and the second moment, and the data transmission condition is also met when the user wearing the headset is back to the user device. As shown in FIG. 11, when the user wears the headset at a position 1 and a position 2 respectively (the position 2 may be understood as a mirror position of the position 1), it may be determined that the absolute value of the difference between the first moment and the second moment is less than the threshold. However, the user is back to the mobile phone at the position 2. In this case, there is a high probability that the user does not want to perform data stream transmission with the mobile phone. Therefore, to avoid a mirror problem, the third receiving device is disposed on the head-mounted device, to determine, based on a relative value relationship between the third moment and the first moment or the second moment, that the data transmission condition is truly met only at the position 1, and the user is back to the user device at the position 2. Therefore, the target data stream is transmitted only at the position 1. This avoids incorrect transmission when the user wearing the headset is back to the user device, and improves data transmission precision.

Although FIG. 9, FIG. 10, and FIG. 11 show several manners of disposing the third receiving device, in actual application, positions and a quantity of the third receiving devices may be flexibly set, provided that each third receiving device can be disposed to accurately determine whether the user wearing the headset is facing the user device or backing to the user device, to avoid the mirror problem. For example, the third receiving devices shown in both FIG. 9 and FIG. 10 may be disposed on the head-mounted device, and whether the data transmission condition is met is comprehensively determined based on the third moment at which each third receiving device receives the first target signal.

It should be understood that, more receiving devices may be disposed on the head-mounted device. A manner of determining whether the data transmission condition is met after the more receiving devices are disposed is similar to the manner when two or three receiving devices are disposed. In the two manners, whether the data transmission condition is met is determined based on the moments at which the receiving devices receive the target signal, and details are not described again.

In an implementation of this application, the user device may have a plurality of sending devices, for example, a plurality of sound-making units (a left sound-making unit and a right sound-making unit), and the user device may send a plurality of target signals to the head-mounted device via the plurality of sound-making units. In this application, descriptions are provided by using an example in which there are two sending devices on the user device. Therefore, in addition to sending the first target signal to the head-mounted device, the user device further sends a second target signal to the head-mounted device.

For example, a data stream transmission process is described by using an example in which the first receiving device and the second receiving device are disposed on the head-mounted device, and the user device sends the first target signal and the second target signal to the head-mounted device.

Optionally, if the user device determines whether the data transmission condition is met, the user device further indicates to send the second target signal to the head-mounted device. The user device may indicate, by using indication information, to send the second target signal, or indicate, by using new indication information, to send the second target signal. A manner of indicating to send the second target signal is not limited in this application. The user device obtains, from the head-mounted device, a fourth moment at which the first receiving device receives the second target signal and a fifth moment at which the second receiving device receives the second target signal. When determining that the absolute value of the difference between the first moment and the second moment is within a preset range, and an absolute value of a difference between the fourth moment and the fifth moment is within the preset range, the user device transmits the target data stream to the head-mounted device.

Optionally, if the head-mounted device determines whether the transmission condition is met, the head-mounted device enables, based on an indication of the user device, detection of the second target signal, and obtains a fourth moment and a fifth moment, where the fourth moment is obtained based on a time point at which the first receiving device receives the second target signal, and the fifth moment is obtained based on a time point at which the second receiving device receives the second target signal. When determining that the absolute value of the difference between the first moment and the second moment is less than the preset value, and an absolute value of a difference between the fourth moment and the fifth moment is also less than the preset value, the head-mounted device sends the first indication information to the user device.

It should be understood that, when more sending devices are disposed on the user device, more target signals may be sent. For a target signal sent by each sending device, the user device or the head-mounted device obtains a determining result that corresponds to the target signal and that indicates whether the transmission condition is met, where the determining result is determined based on a moment at which each receiving device on the head-mounted device receives the target signal. Finally, the user device or the head-mounted device finally determines, based on determining results corresponding to the plurality of sending devices, whether the transmission condition is met. For example, when the determining results corresponding to the plurality of sending devices all indicate that the transmission condition is met, the user device or the head-mounted device determines that the transmission condition is met; or when a ratio of a quantity of determining results in the determining results corresponding to the plurality of sending devices indicates that the head-mounted device meets the transmission condition to a quantity of the plurality of sending devices exceeds a preset proportion, the user device or the head-mounted device determines that the transmission condition is met. Therefore, a manner of combining the determining results corresponding to the plurality of sending devices is not limited in this application.

In an implementation of this application, the user device transmits the target data stream to the head-mounted device only when determining, based on the first moment and the second moment, that the data transmission condition is met and receiving a switching instruction of the user, where the switching instruction is used to instruct that the user device is allowed to transmit the target data stream to the head-mounted device.

For example, when determining that the data transmission condition is met, the user device may output prompt information, where the prompt information prompts the user whether to output the target data stream on the user device by using the head-mounted device. If the user inputs the switching instruction that allows switching, the user device transmits the target data stream to the head-mounted device. The prompt information may be output on the user device, or may be output on the head-mounted device. This is not limited in this application.

Figure 12:
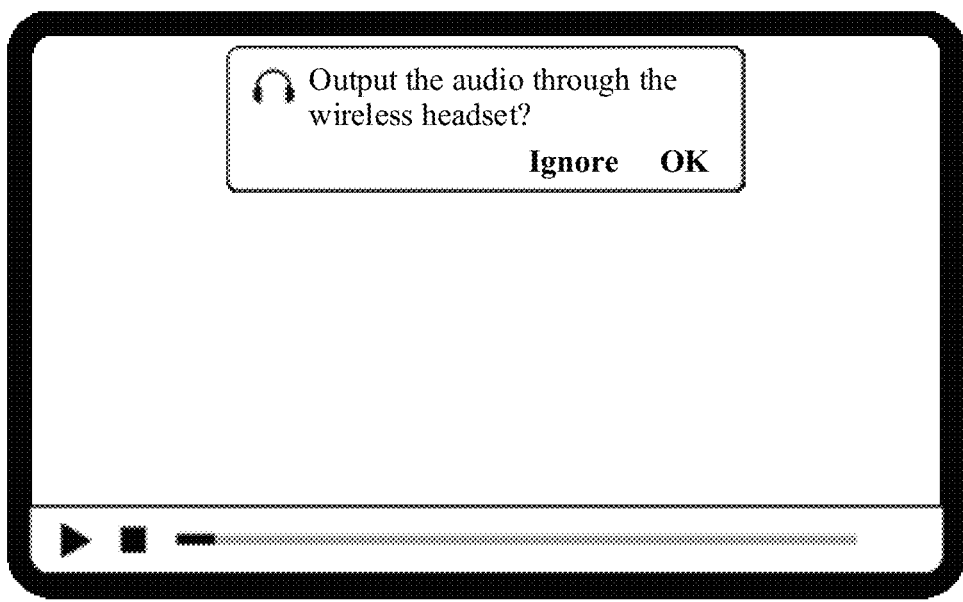
FIG. 12 is a schematic diagram of outputting prompt information on a user device according to an embodiment of this application.

For example, as shown in FIG. 12, the prompt information "Output the audio through the wireless headset" is output on the user device in a form of a pop-up window. When the user clicks a button "OK", the user device receives the switching instruction of the user, and transmits the target data stream to the wireless headset based on the handover instruction.

Figures 13, 14A:
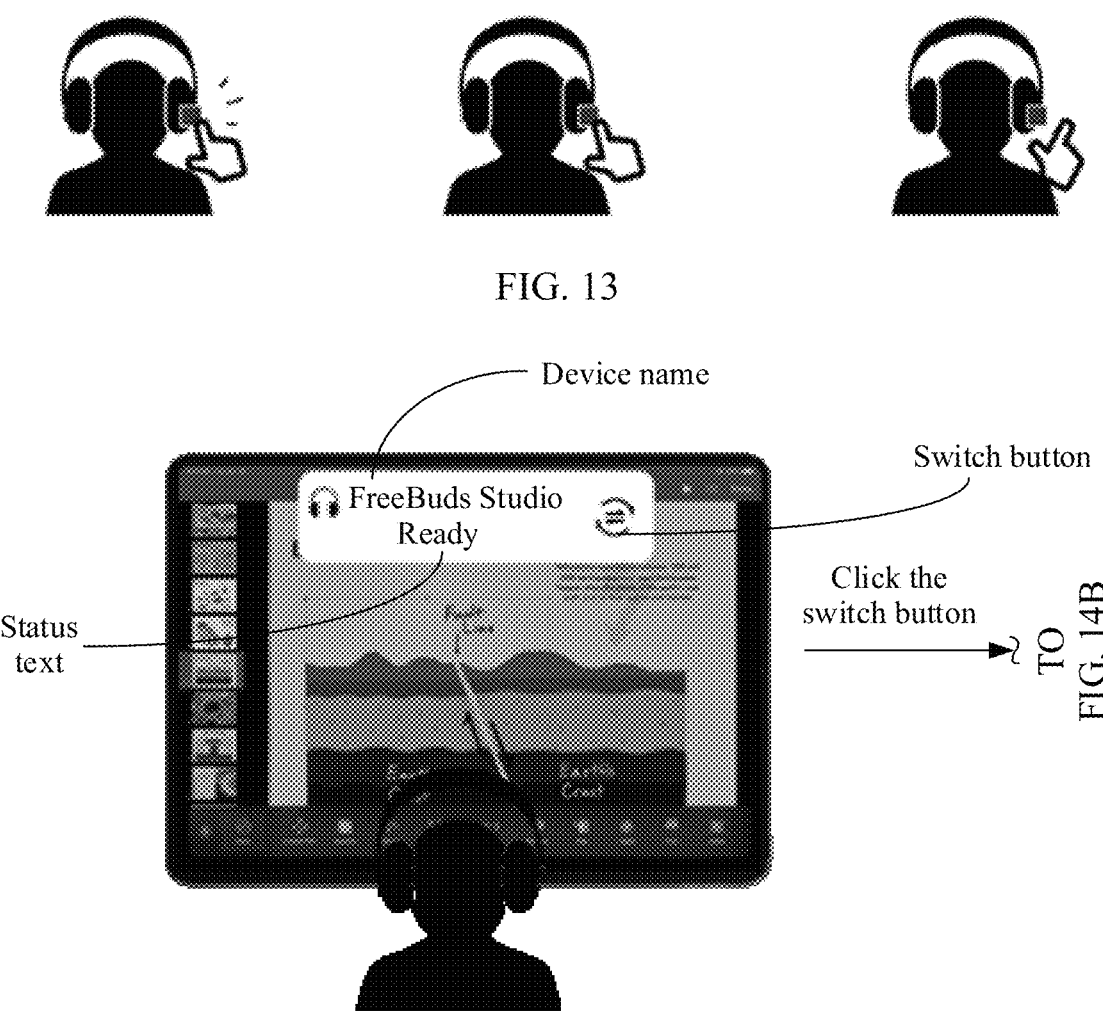
FIG. 13 is a schematic diagram of an input switching instruction according to an embodiment of this application.
FIG. 14A and FIG. 14B are a schematic diagram of outputting a device list on a user device according to an embodiment of this application.

For another example, as shown in FIG. 13, when the user presses a button, a process of establishing the connection between the user device and the head-mounted device is triggered. When determining that the data transmission condition is met, the user device may output voice prompt information "Output the audio through the wireless headset" on the head-mounted device. When the user releases the button, the head-mounted device sends the switching instruction to the user device, and correspondingly, the user device obtains the switching instruction, and transmits the data stream to the head-mounted device based on the switching instruction.

It can be learned that, in this implementation, when determining that the data transmission condition is met, the user device may further prompt the user to actively confirm whether to transmit the target data stream, and transmit the target data stream to the head-mounted device only after receiving the switching instruction of the user, thereby further improving data stream transmission accuracy.

In an implementation of this application, after transmitting the target data stream to the head-mounted device, the user device may further display a switching list on the user device, where the switching list is used to display a device identifier of at least one candidate user device. For example, the at least one candidate user device may be a user device that has established a connection to the head-mounted device. Then, the user device obtains an operation instruction for a device identifier of a first candidate user device in the at least one candidate user device, and the user device sends indication information to the first candidate user device in response to the operation instruction, where the indication information indicates the first candidate user device to transmit a target data stream to the head-mounted device, and the first candidate user device is any one of the at least one candidate user device.

Figure 14B:
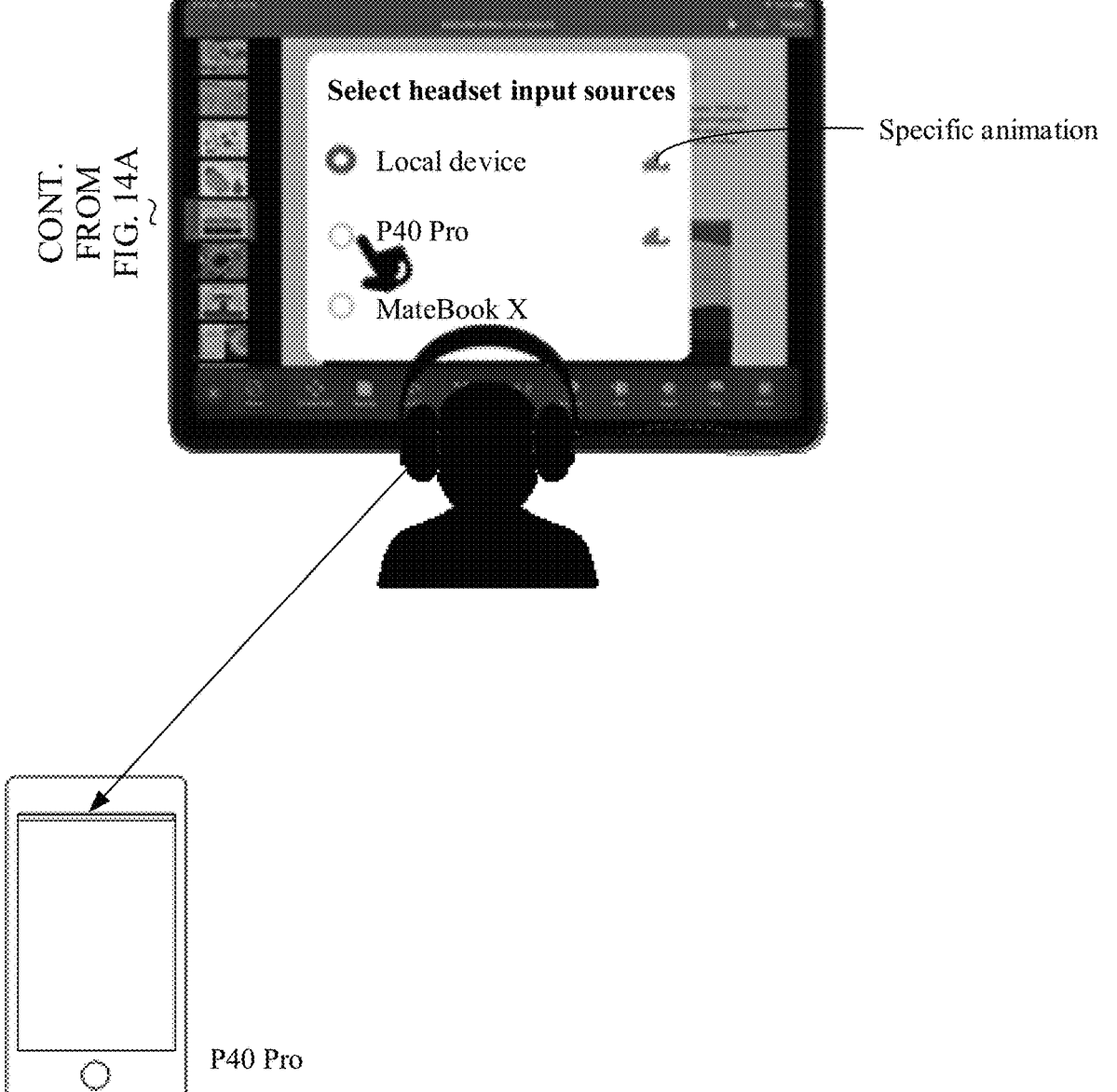

For example, the user device has a display module, and in a process in which the user device transmits the target data stream to the head-mounted device, the display module of the user device may output feedback information. The feedback information is used to feed back a current output status of the head-mounted device. For example, a pop-up window may be output in a visual interface of the user device by using a feedback module of the user device. The pop-up window includes the feedback information. As shown in FIG. 14A and FIG. 14B, the feedback information includes but is not limited to the following three parts:

1. Name and/or icon of the head-mounted device; 2. Status text; and 3. Switch button.

Optionally, the name and/or icon of the head-mounted device indicate/indicates basic information of the head-mounted device. As shown in FIG. 14A and FIG. 14B, the name of the head-mounted device indicates that the name of the head-mounted device is "FreeBuds Studio", and the icon indicates that the head-mounted device is "Headset".

Optionally, the status text indicates a current operating status of the head-mounted device.

Optionally, when the user clicks the switch button, the switching list is on the user device, and the switching list includes the device identifier of at least one candidate user device. As shown in FIG. 14A and FIG. 14B, the at least one candidate user device includes "Local device" (namely, the user device), "P40 Pro", and "MateBook X", and some or all candidate user devices in the device list may be matched with a specific animation, where the specific animation indicates that the candidate user device is currently outputting an audio.

Further, when receiving the operation instruction for the device identifier of the first candidate user device in the at least one candidate user device, for example, a click operation on the device identifier of the first candidate user device, the user device sends the indication information to the first candidate user device in response to the operation instruction, where the indication information indicates the first candidate user device to transmit a target data stream to the head-mounted device. Correspondingly, the first candidate user device transmits the data stream to the head-mounted device based on the indication information. The user device and the first candidate user device are in a same local area network.

In an implementation of this application, the head-mounted device has two connection manners. One is a single-connection manner, that is, the head-mounted device can establish a connection to only one user device and output a data stream transmitted by the user device. The other is a multi-connection manner, that is, the head-mounted device can establish connections to a plurality of user devices but output a data stream transmitted by only one user device.

It should be understood that, if the head-mounted device operates in a single-connection mode, after sending the indication information to the first candidate user device, the user device needs to actively disconnect from the head-mounted device, so that the first candidate user device establishes a connection to the head-mounted device, and transmits the data stream to the head-mounted device. If the head-mounted device operates in a multi-connection mode, after sending the indication information to the first candidate user device, the user device may further continue to maintain the connection to the head-mounted device, but no longer transmit the data stream to the head-mounted device, or may actively disconnect from the head-mounted device. If the first candidate user device does not establish a connection to the head-mounted device before, the first candidate user device needs to first establish a connection to the head-mounted device, and then transmit the target data stream to the head-mounted device; or if the first candidate user device has established a connection to the head-mounted device before, the first candidate user device directly transmits the target data stream to the head-mounted device.

For example, as shown in FIG. 14A and FIG. 14B, the head-mounted device is currently receiving the data stream transmitted by a computer. When the mobile phone "P40 Pro" receives an incoming call, but the mobile phone is not near the user, and the user does not want to fetch the mobile phone, the user may click "P40 Pro" in the device list displayed on the computer, which is equivalent to inputting a switching instruction for switching a connection of the head-mounted device to the mobile phone "P40 Pro", so that the computer sends the indication information to the mobile phone. After receiving the indication information, the mobile phone transmits a data stream to the headset, that is, transmits a call audio to the headset, so that the user can answer the call on the mobile phone through the headset.

It can be learned that, the user device displays the switching list, the user can actively switch, according to a requirement, the connection of the head-mounted device to another candidate user device that needs to output a data stream, thereby improving data stream transmission flexibility.

With reference to the accompanying drawings, the following describes a process of transmitting the data stream between the mobile phone and the headset in this application.

Figure 15:
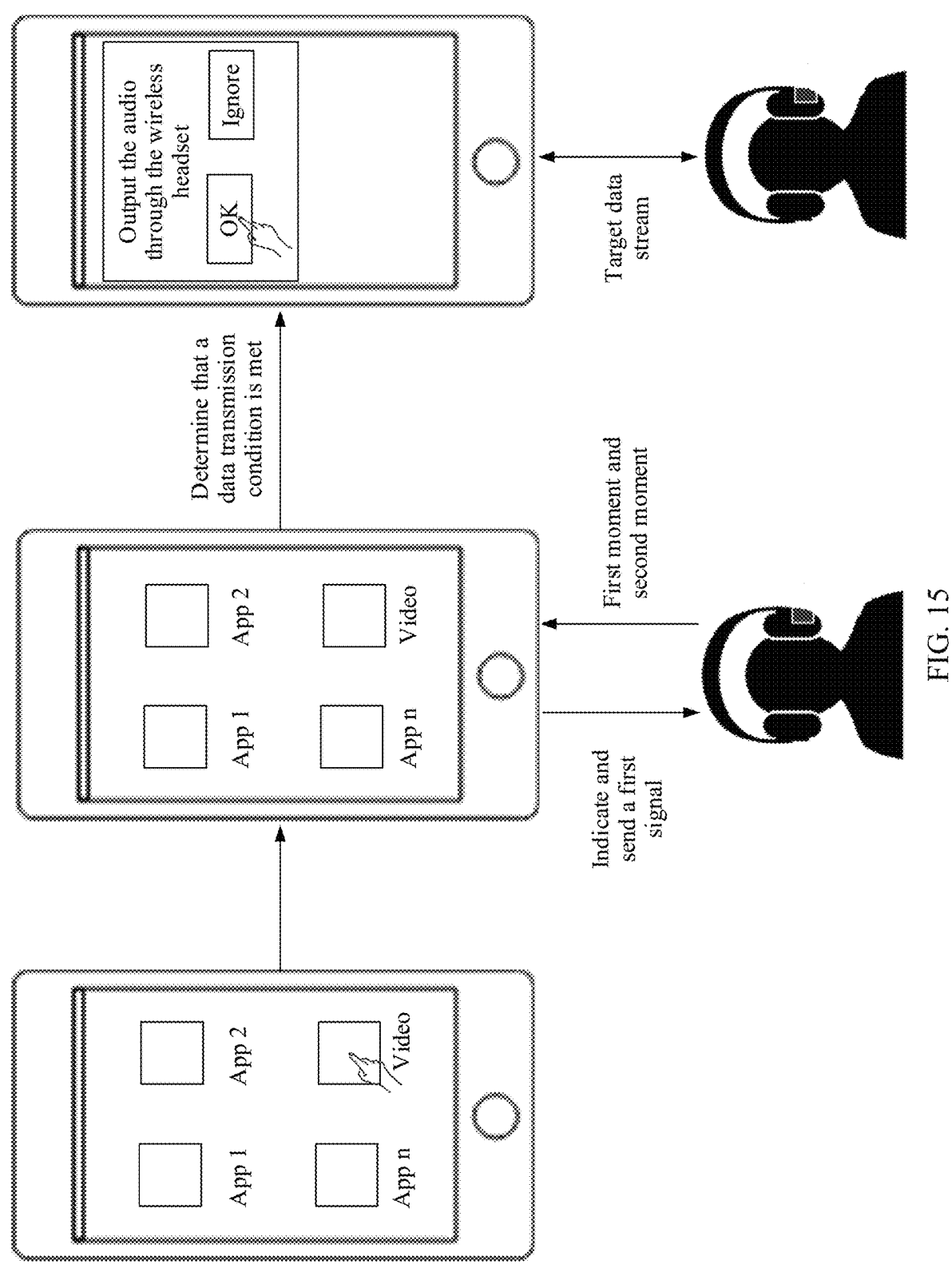
FIG. 15 is a schematic diagram of a scenario in which a user device triggers a first preset event to transmit data according to an embodiment of this application.

Scenario 1: As shown in FIG. 15, when the user starts to play videos on the mobile phone, the mobile phone indicates and sends the first target signal to the headset in a connected state. Correspondingly, the headset enables, based on the indication of the mobile phone, detection of the first target signal, and when detecting the first target signal, obtains a first moment at which a left microphone in the headset receives the first target signal and a second moment at which a right microphone in the headset receives the second target signal; and then the headset sends the first moment and the second moment to the mobile phone. The mobile phone determines, based on the first moment and the second moment, that the data transmission condition is met. To further ensure connection precision, the user taps to play a video on the mobile phone, and puts more attention on the mobile phone at this time. A window may pop up on the mobile phone, and prompt information "Output the audio through the wireless headset" is displayed in the window. If the user taps a virtual button "OK" on the mobile phone, the mobile phone transmits the data stream to the wireless headset, that is, the video is played through the headset. If the user taps the virtual button "Ignore" on the mobile phone, the mobile phone does not transmit the data stream to the wireless headset, but plays the video via a sound-making unit.

Figure 16:
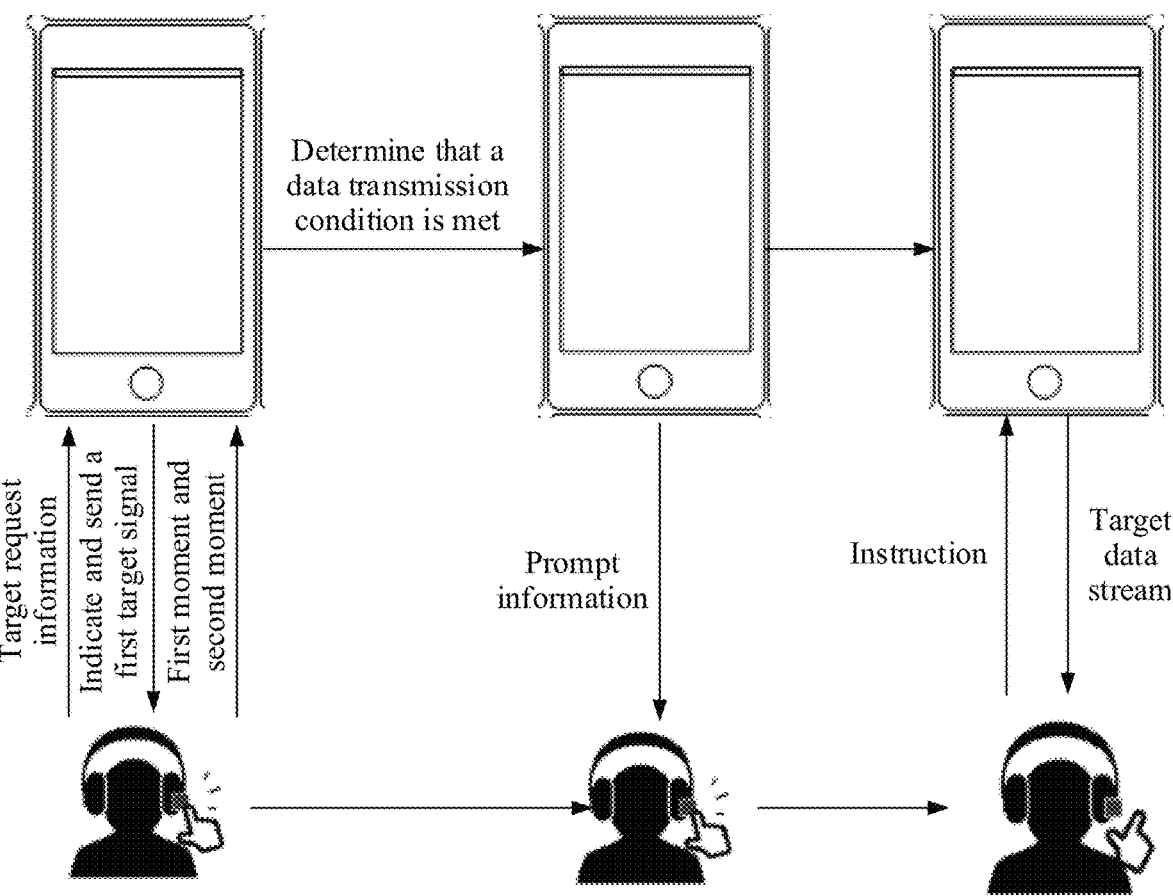
FIG. 16 is a schematic diagram of a scenario in which a head-mounted device triggers a second preset event to transmit data according to an embodiment of this application.

Scenario 2: As shown in FIG. 16, when the user presses a button on the headset, the headset searches for the mobile phone in a range, and sends target request information to the mobile phone, to request the mobile phone to send the first target signal to the headset. Then, after receiving the target request information, the mobile phone indicates and sends the first target signal to the headset. Correspondingly, the headset enables, based on the indication of the mobile phone, detection of the first target signal, and when detecting the first target signal, obtains a first moment at which a left microphone in the headset receives the first target signal and a second moment at which a right microphone in the headset receives the second target signal; and then, the headset sends the first moment and the second moment to the mobile phone. The mobile phone determines, based on the first moment and the second moment, that the data transmission condition is met. To further ensure connection precision, the user presses the button on the wireless headset, puts more attention on the headset, and may not focus on what is displayed on the mobile phone. Therefore, the mobile phone may output prompt information through the headset, where the prompt information indicates whether to connect the headset to the mobile phone. If the user releases the button, the headset sends an instruction for agreeing to establish a connection to the mobile phone. In this case, the mobile phone may transmit the data stream to the headset based on the instruction.

Compared with an existing manner of establishing a connection between a headset and a user device, the data stream transmission method provided in embodiments of this application can enable the user to have better connection experience in the following several scenarios.

Scenario 1: The user wearing a headset watches a movie on a tablet computer (the headset is connected to the tablet computer). In this case, when a mobile phone is in an incoming call, and the user removes the headset and picks up the mobile phone to answer the call, the mobile phone sends a first target signal to the headset, and determines, based on a first moment and a second moment at which two microphones in the headset receive the first target signal, that the headset does not face the mobile phone. Therefore, no data stream is transmitted to the headset, incorrect data transmission is not caused between the headset and the mobile phone, and the user makes the call through an earpiece of the mobile phone, thereby improving user call experience.

Scenario 2: The user wearing a headset plays a game on a mobile phone (the headset is connected to the mobile phone). In this case, when a person around the user picks up a tablet computer of the user to watch a video, the tablet computer sends a first target signal to the headset, and determines, based on a first moment and a second moment at which two microphones in the headset receive the first target signal, that the headset does not face the tablet computer. Therefore, the tablet computer does not transmit a data stream to the headset, the connection between the headset and the mobile phone is continued, and incorrect data transmission is not caused between the headset and the tablet computer, thereby improving user gaming experience.

Scenario 3: The user wearing a headset watches a movie on a tablet computer, and the user feels bored to pick up a mobile phone to browse a short video. In this case, although the user wearing the headset faces the mobile phone, the user device may determine that the headset faces the user device. Therefore, the mobile phone may first play the short video in a mute mode by default, and output prompt information in a dialog box to indicate whether to switch a connection of the headset to the mobile phone. If the user confirms the switching, the user switches the connection of the headset from the tablet computer to the mobile phone, and the headset performs data stream transmission with the mobile phone; or if the user confirms no switching, the headset continues to maintain the connection to the tablet computer, and continues to perform data stream transmission with the tablet computer. Therefore, when whether the connection is switched is not determined, the prompt information may be output, to implement accurate switching, thereby avoiding incorrect data transmission and improving user experience of watching the movie.

Scenario 4: The user wearing a headset watches a movie on a tablet computer, and when feeling bored, the user first pauses the video on the tablet computer, and picks up a mobile phone to brow a short video. In this case, the mobile phone determines that the headset faces the mobile phone, and the mobile phone has an audio output, but the tablet computer has no audio output. Therefore, the mobile phone may directly switch a connection of the headset to the mobile phone, and perform data stream transmission with the headset, to implement an automatic connection between the mobile phone and the headset, without a manual operation of the user, thereby improving user experience.

Figure 17:
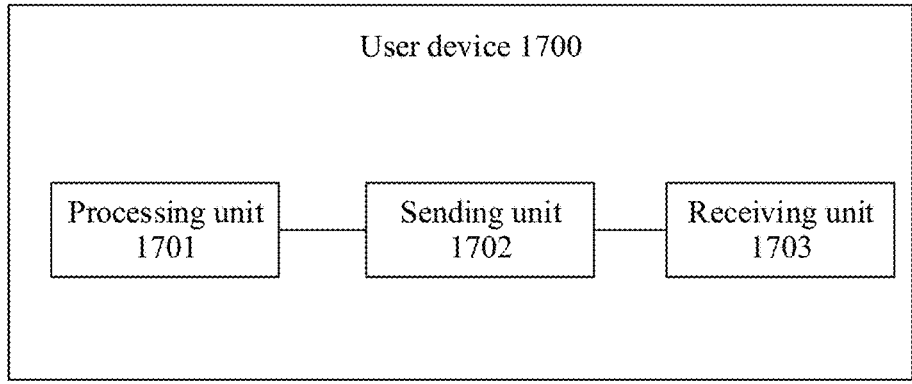
FIG. 17 is a schematic diagram of a structure of a user device according to an embodiment of this application.

FIG. 17 is a schematic diagram of a structure of a user device according to an embodiment of this application. As shown in FIG. 17, the user device 1700 includes a processing unit 1701, a sending unit 1702, and a receiving unit 1703.

The sending unit 1702 is configured to send a first target signal.

The processing unit 1701 is configured to: obtain a first moment, where the first moment is obtained based on a time point at which a first receiving device on a head-mounted device receives the first target signal; and obtain a second moment, where the second moment is obtained based on a time point at which a second receiving device on the head-mounted device receives the first target signal, and the first receiving device and the second receiving device are located at different positions of the head-mounted device.

When the processing unit 1701 determines, based on the first moment and the second moment, that a data transmission condition is met, the processing unit 1701 transmits a target data stream to the head-mounted device.

It should be understood that when the first target signal is an ultrasonic signal, the sending unit 1702 may be a functional unit of a transceiver configured to send the ultrasonic signal. For example, the transceiver is a speaker. In this case, the processing unit 1701 may control another sending unit (for example, an antenna) to transmit a data stream to the head-mounted device. When the first target signal is a signal instruction, the sending unit 1702 may be a functional unit of a transceiver configured to send the signal instruction. For example, the transceiver is an antenna. In this case, the processing unit 1701 may control the sending unit 1702 to transmit a data stream to the head-mounted device.

For more detailed descriptions of the processing unit 1701, the sending unit 1702, and the receiving unit 1703, refer to related descriptions in the foregoing method embodiments. Details are not described herein again.

Figure 18:
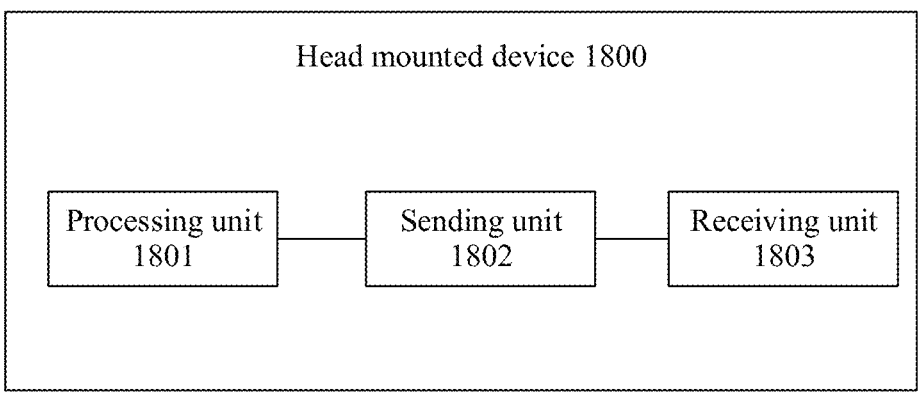
FIG. 18 is a schematic diagram of a structure of a head-mounted device according to an embodiment of this application.

FIG. 18 is a schematic diagram of a structure of a head-mounted device according to an embodiment of this application. As shown in FIG. 18, the head-mounted device 1800 includes one or more processing units 1801, a sending unit 1802, and a receiving unit 1803.

The one or more processing units 1801 are configured to: detect a first target signal sent by a user device; obtain a first moment, where the first moment is obtained based on a time point at which a first receiving device receives the first target signal; and obtain a second moment, where the second moment is obtained based on a time point at which a second receiving device receives the first target signal.

The one or more processing units 1801 determine, based on the first moment and the second moment, that a data transmission condition is met, and control the sending unit 1802 to send first indication information to the user device.

The receiving unit 1803 is configured to receive a target data stream transmitted by the user device in response to the first indication message.

It should be understood that, when the first target signal is an ultrasonic signal, the one or more processing units 1801 include a processing unit configured to detect the ultrasonic signal;

or when the first target signal is a signal instruction, the one or more processing units include a processing unit configured to detect the signal instruction by the user. For example, the processing unit is a functional unit of a processor.

For more detailed descriptions of the one or more processing units 1801, the sending unit 1802, and the receiving unit 1803, refer to related descriptions in the foregoing method embodiments. Details are not described herein again.

Figure 19:
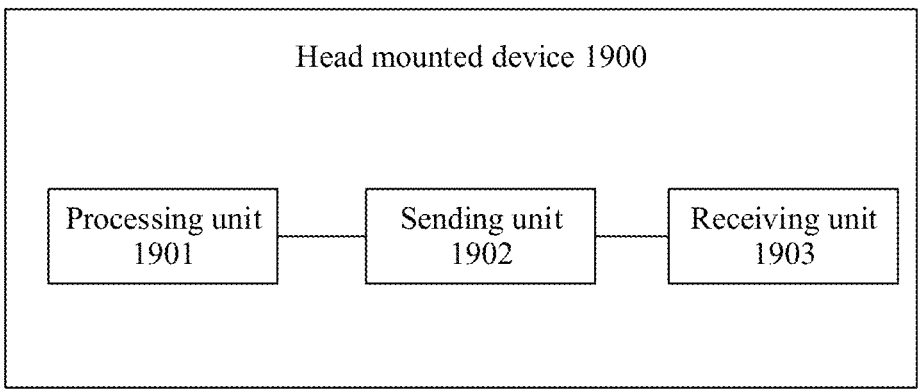
FIG. 19 is a schematic diagram of a structure of another head-mounted device according to an embodiment of this application.

FIG. 19 is a schematic diagram of a structure of another head-mounted device according to an embodiment of this application. As shown in FIG. 19, the head-mounted device 1900 includes one or more processing units 1901, a sending unit 1902, and a receiving unit 1903.

The one or more processing units 1901 are configured to: detect a first target signal sent by a user device; control, in response to detecting the first target signal, the sending unit 1902 to send a first moment to the user device, where the first moment is obtained based on a time point at which a first receiving device receives the first target signal; and control, in response to detecting the first target signal, the sending unit 1902 to send a second moment to the user device, where the second moment is obtained based on a time point at which a second receiving device receives the first target signal.

The receiving unit 1903 is configured to receive a target data stream transmitted by the user device, where the target data stream is transmitted by the user device to the head-mounted device when the first moment and the second moment meet a data transmission condition.

It should be understood that, when the first target signal is an ultrasonic signal, the one or more processing units 1901 include a processing unit configured to detect the ultrasonic signal; or when the first target signal is a signal instruction, the one or more processing units include a processing unit configured to detect the signal instruction by the user. For example, the processing unit is a functional unit of a processor.

For more detailed descriptions of the processing unit 1901, the sending unit 1902, and the receiving unit 1903, refer to related descriptions in the foregoing method embodiments. Details are not described herein again.

Figure 20:
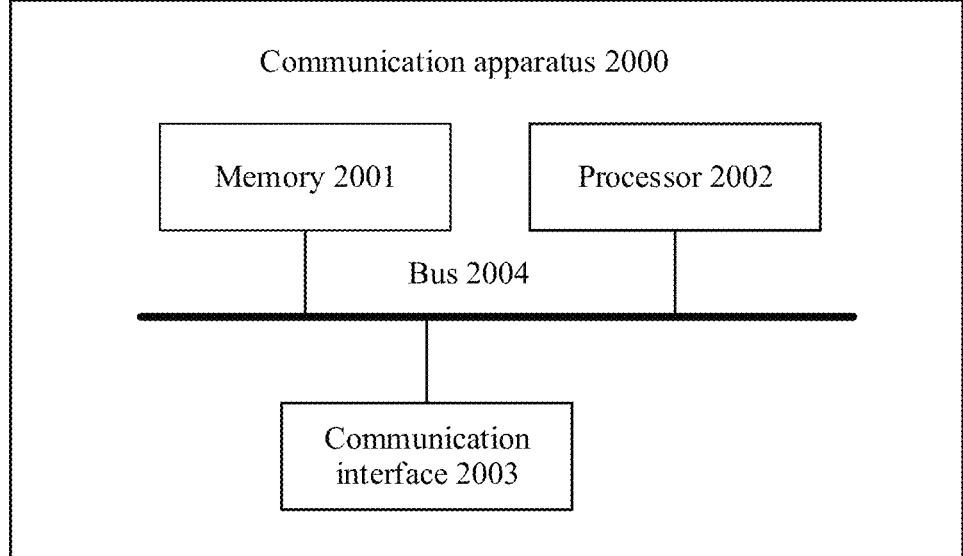
FIG. 20 is a schematic diagram of a structure of a communication apparatus according to an embodiment of this application.

FIG. 20 is a schematic diagram of a structure of a communication apparatus according to an embodiment of this application. The communication apparatus 2000 may be specifically the user device or the head-mounted device; or the communication apparatus 1900 is a chip or a chip system in the user device; or the communication apparatus 2000 is a chip or a chip system in the head-mounted device.

The communication apparatus 2000 shown in FIG. 20 includes a memory 2001, a processor 2002, a communication interface 2003, and a bus 2004. The memory 2001, the processor 2002, and the communication interface 2003 implement mutual communication connection through the bus 2004.

The memory 2001 may be a read only memory (Read Only Memory, ROM), a static storage device, a dynamic storage device, or a random access memory (Random Access Memory, RAM). The memory 2001 may store a program. When the program stored in the memory 2001 is executed by the processor 2002, the processor 2002 and the communication interface 2003 are configured to perform the steps of the data stream transmission method in embodiments of this application.

The processor 2002 may be a general-purpose central processing unit (Central Processing Unit, CPU), a microprocessor, an application-specific integrated circuit (Application-Specific Integrated Circuit, ASIC), a graphics processing unit (graphics processing unit, GPU), or one or more integrated circuits, and is configured to execute a related program, to implement a function that needs to be performed by a unit in an audio feature compensation apparatus or an audio recognition apparatus in embodiments of this application, or perform the data stream transmission method in method embodiments of this application.

The processor 2002 may be an integrated circuit chip and has a signal processing capability. In an implementation process, the steps of the data stream transmission method in this application may be implemented by using a hardware integrated logical circuit in the processor 2002 or instructions in a form of software. The processor 2002 may alternatively be a general-purpose processor, a digital signal processor (Digital Signal Processor, DSP), an application-specific integrated circuit (ASIC), a field programmable gate array (Field Programmable Gate Array, FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor, or the like. Steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 2001. The processor 2002 reads information in the memory 2001, and completes, in combination with hardware of the processor, functions that need to be performed by units included in the user device or the head-mounted device in embodiments of this application, or performs the steps in the data stream transmission method in method embodiments of this application.

The communication interface 2003 uses a transceiver apparatus, for example, but not limited to, a transceiver, to implement communication between the communication apparatus 2000 and another device or a communication network.

The bus 2004 may include a path for transmitting information between components (for example, the memory 2001, the processor 2002, and the communication interface 2003) of the communication apparatus 2000.

It should be noted that although the communication apparatus 2000 shown in FIG. 20 only shows the memory, the processor, and the communication interface, in a specific implementation process, a person skilled in the art should understand that the communication apparatus 2000 further includes other components that are necessary to implement normal running. In addition, according to a specific requirement, a person skilled in the art should understand that the communication apparatus 2000 may further include hardware components for implementing other additional functions. In addition, a person skilled in the art should understand that the communication apparatus 2000 may include only components required for implementing embodiments of this application, but not necessarily include all the components shown in FIG. 20.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data stream transmission method, applied to a first device, wherein the method comprises:
sending a first target signal;
obtaining a first moment, wherein the first moment is obtained based on a time point at which a first receiving device on a second device receives the first target signal;
obtaining a second moment, wherein the second moment is obtained based on a time point at which a second receiving device on the second device receives the first target signal, and
the first receiving device and the second receiving device are located at different positions of the second device, and the second device is a head-mounted device; and
determining, based on the first moment and the second moment, that the first and second receiving devices are a distance from the first device that is the same or nearly the same, and in response, transmitting a target data stream to the second device via a short-range wireless connection; and
sending indication information to a first candidate user device, wherein the indication information indicates the first candidate user device to transmit a data stream to the second device.

2. The method according to claim 1, wherein the first receiving device and the second receiving device are symmetrically disposed on a left side and a right side of the second device; and

US 12,639,030 B2

37 the determining, based on the first moment and the second moment, the first and second receiving devices are a distance from the first device that is the same or nearly the same comprises:
determining that an absolute value of a difference between the first moment and the second moment is less than a preset value; and
sending a second target signal and calculating fourth and fifth moments, and determining an absolute value of a difference between the fourth moment and the fifth moment is less than the preset value.

3. The method according to claim 2, wherein
the second device further comprises a third receiving device, and the third receiving device and the first receiving device are located at different positions from the second receiving device, so that when the second device is worn, the first receiving device and the third receiving device present different front-to-back position relationships in a user face orientation; and
the method further comprises:
obtaining a third moment, wherein the third moment is obtained based on a time point at which a third receiving device on the second device receives the first target signal; and
determining whether the third moment is before or after the first moment, and based a relative timing of the third moment in relation to the first moment, determining whether the second device faces the first device.

4. The method according to claim 1, wherein before the sending a first target signal, the method further comprises:
detecting a first preset event, wherein
the first preset event comprises at least one of the following:
a video playing event, used to indicate video playing,
an audio playing event, used to indicate audio playing,
an incoming call event,
an outgoing call event; or
receiving target request information sent by the second device.

5. The method according to claim 1, wherein the determining, based on the first moment and the second moment, that the data transmission condition is met comprises:
determining, based on the first moment and the second moment, that a data transmission condition is met, and obtaining a switching instruction of a user.

6. The method according to claim 1, further comprising:
displaying a switching list on the first device, wherein the switching list comprises a device identifier of at least one candidate user device;
obtaining an operation instruction for a device identifier of the first candidate user device in the at least one candidate user device; and
sending indication information to the first candidate user device in response to the operation instruction, wherein the indication information indicates the first candidate user device to transmit a data stream to the second device.

7. A data stream transmission method, applied to a second device, wherein the second device is a head-mounted device, the second device comprises a first receiving device and a second receiving device, the first receiving device and the second receiving device are located at different positions of the second device, and the method comprises:
detecting a first target signal sent by a first device;
obtaining a first moment, wherein the first moment is obtained based on a time point at which the first receiving device receives the first target signal;

38 obtaining a second moment, wherein the second moment is obtained based on a time point at which the second receiving device receives the first target signal;
determining, based on the first moment and the second moment, that a data transmission condition is met indicating that the first and second receiving devices are a distance from the first device that is the same or nearly the same, and in response sending first indication information to the first device;
detecting a second target signal and calculating fourth and fifth moments, and determining an absolute value of a difference between the first and second moment and a difference between the fourth moment and the fifth moment is less than a preset value; and
receiving a target data stream transmitted by the first device in response to the first indication information.

8. The method according to claim 7, wherein the second device is a headset or glasses, and
when the second device is a headset, the second device comprises a left sound-making unit and a right sound-making unit;
a distance between the first receiving device and the left sound-making unit is shorter than a distance between the first receiving device and the right sound-making unit; and
a distance between the second receiving device and the right sound-making unit is shorter than a distance between the second receiving device and the left sound-making unit; or
when the second device is glasses, the second device comprises a left frame temple and a right frame temple;
a distance between the first receiving device and the left frame temple is shorter than a distance between the first receiving device and the right frame temple; and
a distance between the second receiving device and the right frame temple is shorter than a distance between the second receiving device and the left frame temple.

9. The method according to claim 7, wherein the first receiving device and the second receiving device are symmetrically disposed on a left side and a right side of the second device; and the determining, based on the first moment and the second moment, that the data transmission condition is met comprises:
determining that an absolute value of a difference between the first moment and the second moment is less than a preset value.

10. The method according to claim 9, wherein
the second device further comprises a third receiving device, and the third receiving device, the first receiving device, and the second receiving device are located at different positions of the second device, so that when the second device is worn, the first receiving device and the third receiving device present different front-to-back position relationships in a user face orientation; and the method further comprises:
obtaining a third moment, wherein the third moment is obtained based on a time point at which the third receiving device receives the first target signal; and
the determining, based on the first moment and the second moment, that the data transmission condition is met comprises:
determining that the data transmission condition is met based on the first moment and the second moment and that the first moment and the third moment meet a preset value relationship.

11. The method according to claim 9, wherein the method further comprises:

detecting a second target signal sent by the first device;

obtaining a fourth moment, wherein the fourth moment is obtained based on a time point at which the first receiving device receives the second target signal;

obtaining a fifth moment, wherein the fifth moment is obtained based on a time point at which the second receiving device receives the second target signal; and the determining, based on the first moment and the second moment, that the data transmission condition is met comprises:

determining that the absolute value of the difference between the first moment and the second moment is less than the preset value, and an absolute value of a difference between the fourth moment and the fifth moment is less than the preset value.

12. The method according to claim 7, wherein before the detecting a first target signal sent by a first device, the method further comprises:

detecting a second preset event; and sending a target request message of the first target signal to the first device in response to the second preset event.

13. The method according to claim 12, wherein the second preset event comprises:

a control operation on a button on the second device.

14. A user device, wherein the user device comprises a processing unit, a sending unit, and a receiving unit;

the sending unit is configured to send a first target signal;

the processing unit is configured to:

obtain a first moment, wherein the first moment is obtained based on a time point at which a first receiving device on a head-mounted device receives the first target signal; and obtain a second moment, wherein the second moment is obtained based on a time point at which a second receiving device on the head-mounted device receives the first target signal, and the first receiving device and the second receiving device are located at different positions of the head-mounted device; and when the processing unit determines, based on the first moment and the second moment, that a data transmission condition is met indicating the first and second receiving devices are a distance from the first device that is the same or nearly the same, the processing unit is configured to transmit a target data stream to the head-mounted device via a short-range wireless connection;

the sending unit is further configured to send indication information to a first candidate user device, wherein the indication information indicates the first candidate user device to transmit a data stream to the second device via a short-range wireless connection; and determining whether the third moment is before or after the first moment, and based a relative timing of the third moment in relation to the first moment, determining whether the second device faces the first device.

15. The device according to claim 14, wherein the head-mounted device further comprises a third receiving device, wherein the third receiving device, the first receiving device, and the second receiving device are located at different positions of the head-mounted device, so that when the head-mounted device is worn, the first receiving device and the third receiving device present different front-to-back position relationships in a user face orientation; and the processing unit is further configured to obtain a third moment, wherein the third moment is obtained based on a time point at which the third receiving device receives the first target signal; and the determining, based on the first moment and the second moment, that the data transmission condition is met further comprises:

determining that the data transmission condition is met based on the first moment and the second moment, and that the first moment and the third moment meet a preset value relationship.

16. The device according to claim 14, wherein the sending unit is further configured to send a second target signal;

the processing unit is further configured to: obtain a fourth moment, wherein the fourth moment is obtained based on a time point at which the first receiving device receives the second target signal; and obtain a fifth moment, wherein the fifth moment is obtained based on a time point at which the second receiving device receives the second target signal; and the determining, based on the first moment and the second moment, that the data transmission condition is met further comprises:

determining that the absolute value of the difference between the first moment and the second moment is less than the preset value, and an absolute value of a difference between the fourth moment and the fifth moment is less than the preset value.

17. The device according to claim 14, wherein before the sending unit sends the first target signal, the processing unit is further configured to: detect a first preset event, wherein the first preset event comprises at least one of the following:

a video playing event, used to indicate video playing, an audio playing event, used to indicate audio playing, an incoming call event, an outgoing call event; or control the receiving unit to receive target request information sent by the head-mounted device.

18. The device according to claim 14, wherein when the processing unit determines, based on the first moment and the second moment, that the data transmission condition is met, the processing unit is specifically configured to:

determine, based on the first moment and the second moment, that the data transmission condition is met, and obtain a switching instruction of a user.

19. The device according to claim 14, wherein after the processing unit transmits the target data stream to the head-mounted device, the processing unit is further configured to:

indicate to display a switching list on the user device, wherein the switching list comprises a device identifier of at least one candidate user device;

obtain an operation instruction for a device identifier of the first candidate user device in the at least one candidate user device; and indicate, in response to the operation instruction, the sending unit to send indication information to the first candidate user device, wherein the indication information indicates the first candidate user device to transmit a target data stream to the head-mounted device.

* * * * *